US011155305B2

(12) United States Patent
Ito et al.

(10) Patent No.: US 11,155,305 B2
(45) Date of Patent: Oct. 26, 2021

(54) PRESS-MOLDED PRODUCT, PRESS-MOLDED PRODUCT PRODUCING METHOD, AND PRESS-MOLDED PRODUCT PRODUCING APPARATUS

(71) Applicant: NIPPON STEEL & SUMITOMO METAL CORPORATION, Tokyo (JP)

(72) Inventors: Yasuhiro Ito, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 190 days.

(21) Appl. No.: 16/206,043

(22) Filed: Nov. 30, 2018

(65) Prior Publication Data

US 2019/0176893 A1 Jun. 13, 2019

Related U.S. Application Data

(62) Division of application No. 14/911,557, filed as application No. PCT/JP2014/070682 on Aug. 6, 2014, now Pat. No. 10,196,090.

(30) Foreign Application Priority Data

Sep. 20, 2013 (JP) .................................. 2013-195952

(51) Int. Cl.
*B21D 22/02* (2006.01)
*B21D 22/20* (2006.01)
(Continued)

(52) U.S. Cl.
CPC ............. *B62D 25/02* (2013.01); *B21D 22/02* (2013.01); *B21D 22/20* (2013.01); *B21D 22/26* (2013.01); *B21D 53/88* (2013.01)

(58) Field of Classification Search
CPC ........ B21D 22/02; B21D 22/06; B21D 22/10; B21D 22/20; B21D 22/21; B21D 22/26; B21D 53/88
See application file for complete search history.

(56) References Cited

U.S. PATENT DOCUMENTS 3,851,225 A 11/1974 Luchetta
5,568,680 A 10/1996 Parker
(Continued)

FOREIGN PATENT DOCUMENTS

JP 47-15365 8/1972
JP 59-144530 A 8/1984
(Continued)

OTHER PUBLICATIONS

Machine translation of JP 09-239446 A, 19 Pages. (Year: 2007).*
(Continued)

*Primary Examiner* — Gregory D Swiatocha
(74) *Attorney, Agent, or Firm* — Birch, Stewart, Kolasch & Birch, LLP.

(57) ABSTRACT

A press-molded product capable of improving the bonding strength between a vehicle body reinforcing member and the other member or the rigidity of a vehicle body by enlarging a cross-section of a member to a fullest extent of a design cross-section without forming a notch for preventing a press-molding failure in a ridge-portion flange. A press-molded product is formed by a steel plate having a tensile strength of 340 MPa or more, and includes an inward continuous flange in at least one end portion, the inward continuous flange being obtained by continuously forming a ridge-portion flange, a first flange formed inward in at least a part of an area of the end portion of a first surface portion, and a second flange formed inward in at least a part of an area of the end portion of a second surface portion.

9 Claims, 15 Drawing Sheets

(51) Int. Cl.
  *B21D 22/26* (2006.01)
  *B62D 25/02* (2006.01)
  *B21D 53/88* (2006.01)

(56) References Cited

U.S. PATENT DOCUMENTS

| | | | |
|---|---|---|---|
| 2002/0179206 A1 | 12/2002 | Fujita et al. | |
| 2012/0297853 A1* | 11/2012 | Tanaka | B21D 22/02 |
| | | | 72/350 |

FOREIGN PATENT DOCUMENTS

| | | | |
|---|---|---|---|
| JP | 1-104420 A | | 4/1989 |
| JP | 4-118118 A | | 4/1992 |
| JP | 2554768 B2 | | 11/1996 |
| JP | 2560416 B2 | | 12/1996 |
| JP | 9-19721 A | | 1/1997 |
| JP | 9-239446 A | * | 9/1997 |
| JP | 2006-305627 A | | 11/2006 |
| JP | 2010-82660 A | | 4/2010 |
| JP | 2012-51005 A | | 3/2012 |
| JP | 5174269 B1 | | 4/2013 |
| JP | 2014-50863 A | | 3/2014 |
| RU | 2057606 C1 | | 4/1996 |

OTHER PUBLICATIONS

Chinese Office Action and Search Report, dated Jun. 19, 2018, for corresponding Chinese Application No. 201710254499.2, with partial English Translation of the Office Action.
Chinese Office Action issued in Chinese Application No. 201480050350.7 dated Jul. 17, 2017, together with a partial English translation.
Extended European Search Report, dated Mar. 29, 2017, for corresponding European Application No. 14845798.9.
International Search Report for PCT/JP2014/070682 dated Oct. 28, 2014.
Korean Office Action dated Jun. 23, 2017, for corresponding Korean Application No. 10-2016-7006952, with partial English translation.
Notice of Allowance dated Sep. 24, 2018 in copending U.S. Appl. No. 14/911,557.
Office Action dated Jan. 4, 2018 in copending U.S. Appl. No. 14/911,557.
Office Action dated Mar. 7, 2018 in copending U.S. Appl. No. 14/911,557.
Russian Office Action and Search Report, dated Oct. 4, 2017, for corresponding Russian Application No. 2016109801, with a partial English translation of the Russian Office Action and an English translation of the Russian Search Report.
Taiwanese Office Action and Search Report, dated May 25, 2016, for Taiwanese Application No. 103128419, together with a partial English translation thereof.
Written Opinion of the International Searching Authority for PCT/JP2014/070682 (PCT/ISA/237) dated Oct. 28, 2014.

* cited by examiner column (a)      column (b)

column (a)　　　column (b)

column (a)  column (b)

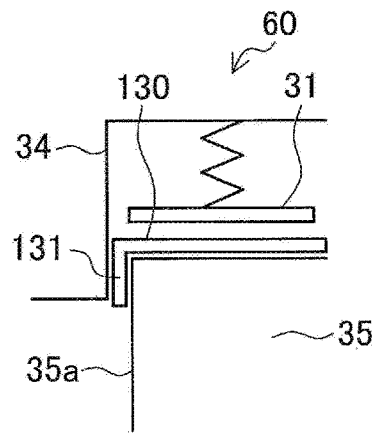
FIG. 10A
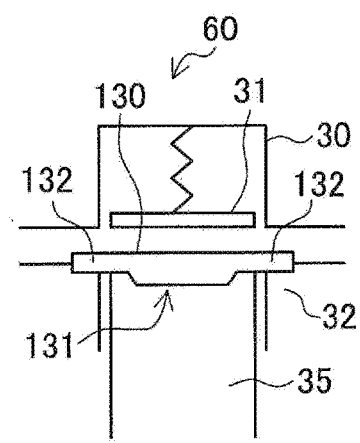
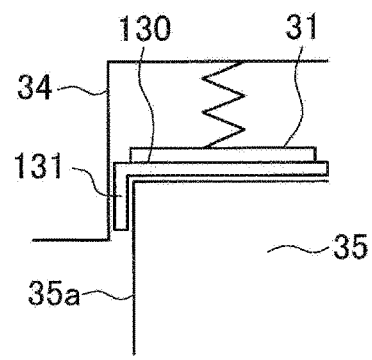
FIG. 10B
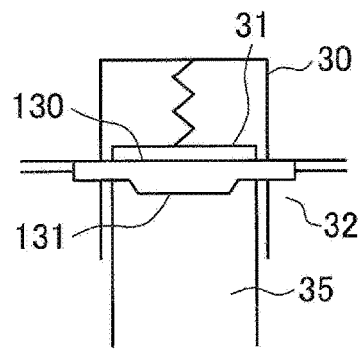
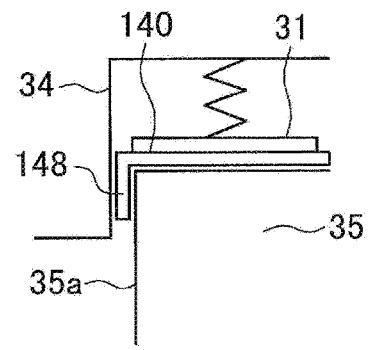
FIG. 10C
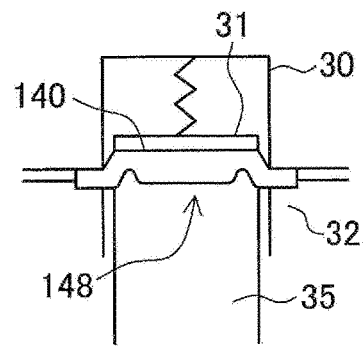
column (a)  column (b)

column (a)　　　　column (b)

column (a)　　　　　column (b)

EXAMPLE 1

EXAMPLE 2

COMPARATIVE EXAMPLE 1

PRESS-MOLDED PRODUCT, PRESS-MOLDED PRODUCT PRODUCING METHOD, AND PRESS-MOLDED PRODUCT PRODUCING APPARATUS

CROSS-REFERENCE TO RELATED APPLICATIONS

This application is a Divisional of copending U.S. application Ser. No. 14/911,557, filed on Feb. 11, 2016, which is the National Phase under 35 U.S.C. § 371 of International Application No. PCT/JP2014/070682, filed on Aug. 6, 2014, which claims the benefit under 35 U.S.C. § 119(a) to Patent Application No. 2013-195952, filed in Japan on Sep. 20, 2013, all of which are hereby expressly incorporated by reference in their entirety into the present application.

TECHNICAL FIELD

The present invention relates to a press-molded product having excellent rigidity and strength and appropriately used as, for example, a vehicle body reinforcing member and also relates to a press-molded product producing method and a press-molded product producing apparatus used to produce the press-molded product.

BACKGROUND ART

A vehicle body has a structure in which a plurality of molding panels is bonded into a box shape by, for example, resistance spot-welding while edge portions of the molding panels overlap one another. A reinforcing member or a strengthening member (hereinafter, generally referred to as a "reinforcing member") is bonded to the box-shaped structure by, for example, resistance spot-welding. As such vehicle body reinforcing members, there are a bumper reinforcement, a locker (side sill), a beltline, a cross member, and a side member.

Each of these reinforcing members is formed as, for example, a press-molded member that has a substantially hat-shaped or groove-shaped cross-section and includes a ceiling plate, two ridge lines connected to the ceiling plate, and two flanges connected to two ridge lines. An end portion opened in the extension direction of the ridge line of such a reinforcing member is bent inward or outward so as to form a flange in the end portion. When the flange overlaps the other member and the flange and the other member are bonded to each other by, for example, resistance spot-welding, a vehicle body reinforcing member is assembled. Depending on the plate thickness of the material, arc-welding may be used instead of spot-welding.

Here, in the specification, a flange obtained by bending the end portion of the reinforcing member toward an area in which an angle formed by two surfaces respectively connected to both ends of the ridge line is smaller than 180° will be referred to as an inward flange. Further, a flange obtained by bending the end portion of the reinforcing member toward an area in which an angle formed by two surfaces respectively connected to both ends of the ridge line is larger than 180° will be referred to as an outward flange.

When the inward flange is formed in the end portion of the reinforcing member, a ridge-portion flange located on the extension line of the ridge line is molded as a flange by shrinking, and hence wrinkles are generated in the ridge-portion flange. For that reason, when such an inward flange overlaps the other member and the inward flange and the other member are bonded to each other by spot-welding, a gap is generated between the inward flange and the other member due to the wrinkles, and hence there is a concern that an assembling problem may occur. Thus, when the reinforcing member having the inward flange formed at the end portion is used, there is a need to weld the reinforcing member to the other member by using the inward flange as a bonding edge while avoiding the generation of wrinkles by, for example, forming a notch in the ridge-portion flange.

However, when the notch is formed in the inward ridge-portion flange so that the flange is not continuous, the performance of the vehicle body reinforcing member involved with torsional rigidity or load transfer efficiency is essentially degraded. Thus, in order to ensure the performance demanded for the reinforcing member by bonding the reinforcing member to the other member through the inward flange, there is a need to mold the shrinking flange while suppressing the generation of wrinkles in the ridge-portion flange without any notch formed in the inward flange.

In addition, in the specification, the "notch formed in the flange" indicates a state where the notch is formed in the entire flange in the width direction so that the flange is not continuous. Further, the width of the flange is used as the meaning of the height of the flange. Thus, when the width of the flange is partially decreased so that a part of the flange is left, the notch is not formed in the flange.

So far, a technique of suppressing the generation of wrinkles during the shrinking flange molding process has been proposed. For example, Patent Literature 1 discloses a technique of forming an unevenness shape, absorbing a difference in length between a front end portion and a base portion in a shrinking flange portion, in a roof panel having a sunroof opening. Further, Patent Literature 2 discloses a technique of preventing the generation of wrinkles by providing a specific drawing bead in a shrinking flange portion during a rectangular tube drawing process. Furthermore, Patent Literature 3 discloses a technique of suppressing the generation of wrinkles by performing a molding process while applying a pressure to a shrinking flange portion using a cam structure.

Further, Patent Literature 4 discloses a plate member molding method in which a flange corresponding portion extending in a direction interesting a bending load direction is formed in a portion to be used as a bent portion and the flange corresponding portion is stretched into a flange so as to have a desired shape. Such a plate member molding method is used to suppress tearing caused by the wrinkles in the flange.

Patent Literature 5 discloses a method in which a plane metal member is bent, upright portions of both side portions are bent outward, and both inclined side portions are strongly pressed by a processing roller of a pressing surface of a side surface of a receiving die so as to be sequentially raised. Such a processing method is used to reduce the distortion or the wrinkles of the upright portion.

PRIOR ART LITERATURE(S)

Patent Literature(s)

[Patent Literature 1] JP 2554768B
[Patent Literature 2] JP 2560416B
[Patent Literature 3] JP H4-118118A
[Patent Literature 4] JP S59-144530A
[Patent Literature 5] JP H1-104420A

SUMMARY OF THE INVENTION

Problem(s) to be Solved by the Invention

The techniques disclosed in Patent Literatures 1 and 2 are used to absorb the extra line length causing the generation of wrinkles and excessive padding by an excessive portion formed in advance. Thus, the spot-welding is not easily performed on the excessive portion and the excessive portion disturbs the spot-welding of the other portion. In such a case, it is difficult to perform the techniques disclosed in Patent Literatures 1 and 2.

Further, the technique disclosed in Patent Literature 3 can suppress the generation of wrinkles of the flange portion of the large-curvature-radius portion having, for example, a curvature radius of 2100 mm and having a feature that the shrinkage rate of the flange portion and the reaction force for the cam structure are small. However, it is difficult to suppress the generation of wrinkles of the flange portion of the small-curvature-radius portion having, for example, a curvature radius of 5 mm and having a feature that the shrinkage rate of the flange portion and the reaction force for the cam structure are large. Particularly, when a high-strength steel plate having a large tensile strength is used, excessive wrinkles are generated, and hence the reaction force from the flange portion increases. For that reason, the cam structure disclosed in Patent Literature 3 cannot suppress the generation of wrinkles.

Further, the technique disclosed in Patent Literature 4 is used to suppress the generation of wrinkles by the stretching process. Thus, the plate thickness of the obtained flange is decreased. As a result, there is a concern that the rigidity of the reinforcing member or the strength of the flange portion may be degraded.

Further, the technique disclosed in Patent Literature 5 is used to form the upright portion by sequentially strongly pressing a plurality of processing rollers. Here, a product in which the curvature radius of the bent portion of the plane metal member is comparatively large is considered as a target. Thus, it is difficult to suppress the generation of wrinkles of, for example, the flange portion of the small-curvature-radius portion having a curvature radius of 5 mm.

In this way, in the member having a substantially hat-shaped or groove-shaped cross-section, it is difficult to form the inward flange without forming the notch in the end portion opened in the extension direction of the ridge portion from the viewpoint of press-moldability. Particularly, Patent Literatures 1 to 5 above are not contrived in consideration of the formation of the flange in the high-strength steel plate having a tensile strength of 340 MPa or more. For that reason, there is no example in which a press-molded product formed by a high-strength steel plate and including a continuous, inward flange without a notch in a ridge-portion flange is used as the vehicle body reinforcing member so far.

In a press-molded product having an outward flange, a hat-shaped or groove-shaped cross-section cannot be enlarged to the fullest extent of the design cross-section by the area of the outward flange. In other words, when the press-molded product can be bonded to the other member through the inward flange instead of the outward flange, the cross-section of the press-molded product can be enlarged to the fullest extent of the design cross-section by the area in which the outward flange is not provided. For that reason, it is possible to improve the bonding strength between the vehicle body reinforcing member and the other member or the bending rigidity or the torsional rigidity of the vehicle body. Thus, there is a desire to realize a press-molded product formed by a high-strength steel plate and including an inward flange.

An object of the invention is to provide a press-molded product including an inward continuous flange without a notch and capable of improving performance involved with the bonding strength between a reinforcing member and the other member or the rigidity of a vehicle body without forming a notch in a ridge-portion flange so as to prevent a defect generated during a press-molding process. Further, another object of the invention is to provide a press-molded product producing method and a press-molded product producing apparatus.

Means for Solving the Problem(s)

In order to solve the above problems, according to an aspect of the present invention, there is provided a press-molded product of a metal plate which is formed by a steel plate having a tensile strength of 340 MPa or more and includes a ridge portion extending in a predetermined direction and first and second surface portions respectively extending from both ends of a ridge line formed by the ridge portion, the press-molded product including: an inward continuous flange in at least one end portion in the predetermined direction. The inward continuous flange is obtained by continuously forming a ridge-portion flange formed inward in the end portion of the ridge portion, a first flange formed inward in at least a part of an area of the end portion of the first surface portion, and a second flange formed inward in at least a part of an area of the end portion of the second surface portion. A flange width ($Lf$) of the ridge-portion flange, a curvature radius ($rf$) of the ridge portion, and an angle ($\theta$) formed by the first surface portion and the second surface portion satisfy Equation (1) below:

$$Lf \leq 0.22 \times rf + 0.13 \times \theta - 5.9 \quad (1),$$

where $0 \text{ mm} \leq rf \leq 35 \text{ mm}$ and $90° \leq \theta \leq 145°$.

A flange width of at least a part of the ridge-portion flange may be smaller than a flange width of at least a part of each of the first flange and the second flange.

A cross-section of the press-molded product when viewed in the predetermined direction may be a hat-shaped or groove-shaped opened cross-section or a closed cross-section.

The press-molded product may be a vehicle body reinforcing member.

A plate thickness of at least an area of an edge portion of the ridge-portion flange in a width direction may be equal to or larger than a plate thickness obtained before a press-molding process.

A plate thickness of at least an area of an edge portion of the ridge-portion flange in a width direction may be equal to or smaller than 1.5 times a plate thickness obtained before a press-molding process.

In order to solve the above problems, according to another aspect of the present invention, there is provided a press-molded product producing method including: a first intermediate molding step of bending at least one end portion of a blank formed by a steel plate having a tensile strength of 340 MPa or more in a predetermined direction so as to mold the blank into a first intermediate member having a flange; and a first press-molding step of bending the first intermediate member in the predetermined direction by press-molding the first intermediate member while nipping the flange inside a predetermined first gap so as to mold a ridge portion extending in the predetermined direction and a first surface portion and a second surface portion respectively extending from both ends of a ridge line formed by the ridge portion and to mold the flange into an inward continuous flange in which a ridge-portion flange formed inward in the end portion of the ridge portion, a first flange formed inward in at least a part of an area of the end portion of the first surface portion, and a second flange formed inward in at least a part of an area of the end portion of the second surface portion are continuous to one another.

In the first press-molding step, a press-molding mold including a die, a punch disposed so as to face the die, and an out-of-plane deformation restricting tool disposed so as to face a side surface of the punch during the press-molding process and to suppress out-of-plane deformation of the flange may be used, and the first intermediate member may be disposed on the punch and the first intermediate member may be press-molded by the die and the punch while the flange is nipped inside the first gap formed by the side surface of the punch and the out-of-plane deformation restricting tool.

The die may support a pad pressing the first intermediate member in a manner that the pad is movable in a pressing direction.

In the first press-molding step, the press-molding mold further including a blank holder which faces the die may be used, and a part of the first intermediate member may be drawn while being constrained by the die and the blank holder.

The punch of the press-molding mold may support an inner pad contacting one surface of the first intermediate member in a manner that the inner pad is movable in a mold clamping direction. In the first press-molding step, the first intermediate member may be press-molded by the die, the punch, and the inner pad while the flange is nipped inside the first gap formed by side surfaces of the punch and the inner pad and the out-of-plane deformation restricting tool.

According to still another aspect of the present invention, there is provided a press-molded product producing method including: a first intermediate molding step of bending at least one end portion of a blank formed by a steel plate having a tensile strength of 340 MPa or more in a predetermined direction so as to mold the blank into a first intermediate member having a flange; a second intermediate molding step of bending the first intermediate member in the predetermined direction by press-molding the first intermediate member while nipping the flange inside a predetermined first gap so as to form an intermediate ridge portion extending in the predetermined direction and a first intermediate surface portion and a second intermediate surface portion respectively extending from both ends of a ridge line formed by the intermediate ridge portion and to mold the flange into an intermediate continuous flange in which an intermediate ridge-portion flange formed in the end portion of the intermediate ridge portion, a first intermediate flange formed in at least a part of an area of the end portion of the first intermediate surface portion, and a second intermediate flange formed in at least a part of an area of the end portion of the second intermediate surface portion are continuous to one another, thereby molding the first intermediate member into a second intermediate member; and a second press-molding step of further bending at least one of the first intermediate surface portion and the second intermediate surface portion formed in the second intermediate member in the predetermined direction while nipping the intermediate continuous flange inside a predetermined second gap so as to mold a ridge portion extending in the predetermined direction and a first surface portion and a second surface portion respectively extending from both ends of a ridge line formed by the ridge portion and to mold the intermediate continuous flange into an inward continuous flange in which a ridge-portion flange formed inward in the end portion of the ridge portion, a first flange formed inward in at least a part of an area of the end portion of the first surface portion, and a second flange formed inward in at least a part of an area of the end portion of the second surface portion are continuous to one another.

In the second intermediate molding step, a press-molding mold including a die, a punch disposed so as to face the die, and an out-of-plane deformation restricting tool disposed so as to face a side surface of the punch during the press-molding process and to suppress out-of-plane deformation of the flange may be used, and the first intermediate member may be disposed on the punch and the first intermediate member may be press-molded by the die and the punch while the flange is nipped inside the first gap formed by the side surface of the punch and the out-of-plane deformation restricting tool.

In the second intermediate molding step, the press-molding mold further including a blank holder which faces the die may be used, and a part of the first intermediate member may be drawn while being constrained by the die and the blank holder.

The punch of the press-molding mold may support an inner pad contacting one surface of the first intermediate member in a manner that the inner pad is movable in a mold clamping direction. In the second intermediate molding step, the first intermediate member may be press-molded by the die, the punch, and the inner pad while the flange is nipped inside the first gap formed by side surfaces of the punch and the inner pad and the out-of-plane deformation restricting tool.

In the second press-molding step, a press-molding mold including a die, a punch disposed so as to face the die, and an out-of-plane deformation restricting tool disposed so as to face a side surface of the punch during the press-molding process and to suppress out-of-plane deformation of the flange may be used, and the second intermediate member may be disposed on the punch and the second intermediate member may be press-molded by the die and the punch while the intermediate continuous flange is nipped inside the second gap formed by the side surface of the punch and the out-of-plane deformation restricting tool.

The die may support a pad pressing the first intermediate member in a manner that the pad is movable in a pressing direction.

A distance (x) of the first gap may satisfy Equation (2) below:

$$1.00 \times t \leq x < 1.40 \times t \qquad (2),$$

where t is a plate thickness (mm) of the blank, and
x is the distance (mm) of the gap.

In order to solve the above problems, according to still another aspect of the present invention, there is provided a press-molded product producing apparatus used to produce a press-molded product including a ridge portion extending in a predetermined direction and a first surface portion and a second surface portion respectively extending from both ends of a ridge line formed by the ridge portion and also including an inward continuous flange in at least one end portion in the predetermined direction, the inward continuous flange being obtained by continuously forming a ridge-portion flange formed inward in the end portion of the ridge portion, a first flange formed inward in at least a part of an area of the end portion of the first surface portion, and a second flange formed inward in at least a part of an area of the end portion of the second surface portion, the press-molded product producing apparatus including: a punch which contacts one surface of an intermediate member having a flange in at least one end portion in the predetermined direction; a die which is disposed so as to face the punch; and an out-of-plane deformation restricting tool which is disposed so as to face a side surface of the punch when the intermediate member is press-molded and to have a predetermined gap between the out-of-plane deformation restricting tool and the side surface of the punch so as to nip the flange in the gap, thereby suppressing out-of-plane deformation of the flange.

A distance (x) of the gap between the side surface of the punch and the out-of-plane deformation restricting tool may satisfy Equation (2) below:

$$1.00 \times t \leq x < 1.40 \times t \tag{2},$$

where t is a plate thickness (mm) of the blank, and
x is the distance (mm) of the gap.

The die may include a pad which is supported so as to be movable in a mold clamping direction and contacts the other surface of the intermediate member.

The punch may include an inner pad which is supported so as to be movable in a mold clamping direction and contacts the one surface of the intermediate member. The out-of-plane deformation restricting tool may be disposed so as to face side surfaces of the punch and the inner pad when the intermediate member is press-molded and to have a predetermined gap between the out-of-plane deformation restricting tool and the side surfaces of the punch and the inner pad so as to nip the flange in the gap.

The press-molded product producing apparatus may bend the intermediate member during the press-molding process.

The press-molded product producing apparatus may further include a blank holder which faces the die. The intermediate member may be drawn while being constrained by the die and the blank holder during the press-molding process.

Effect(s) of the Invention

According to the invention, it is possible to suppress the generation of wrinkles in an inward continuous flange without forming a notch in a ridge-portion flange in order to prevent a defect generated during a press-molding process in a press-molded product formed by a steel plate. Thus, when the press-molded product is used as a vehicle body reinforcing member, it is possible to improve performance involved with the bonding strength between the reinforcing member and the other member or the rigidity of a vehicle body.

BRIEF DESCRIPTION OF THE DRAWING(S)

FIG. 3A illustrates a state where the blank is set in a press-molding apparatus and FIG. 3B illustrates a state where a press-molding process ends.

FIG. 7A illustrates a drawing process and FIG. 7B illustrates an inner pad drawing process.

FIGS. 10A-10C are explanatory diagrams schematically illustrating a state where a second intermediate member is obtained from a first intermediate member by a drawing process of a drawing device in a press-molded product producing method of a third embodiment.

Figure 14A:
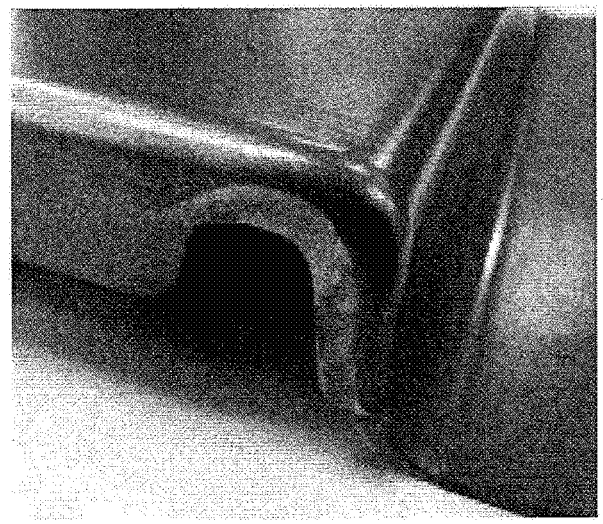
Figure 14B:
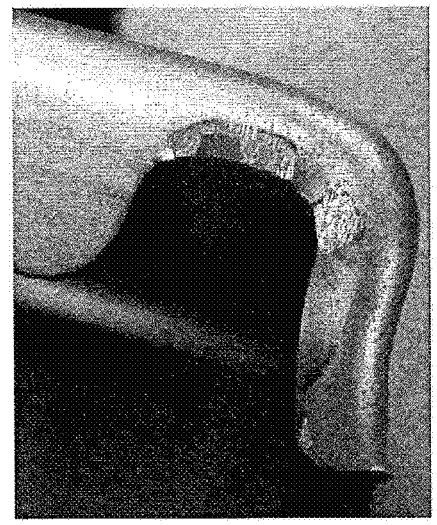
Figure 14C:
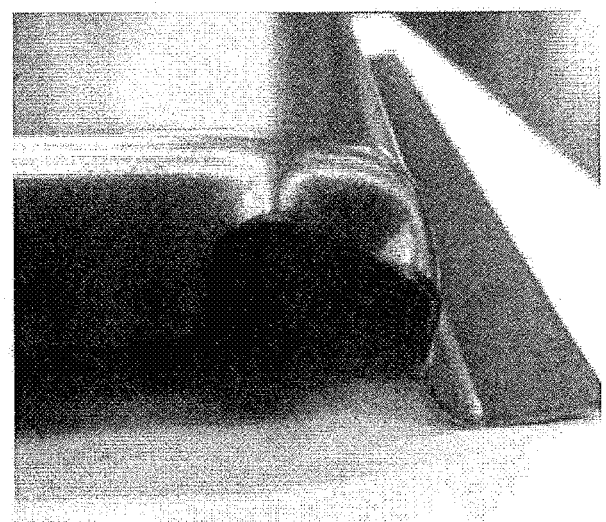

FIGS. 14A-14C are pictures illustrating the appearance in the vicinity of a ridge-portion flange of the obtained press-molded product, where FIG. 14A illustrates a case where the gap between an out-of-plane deformation restricting tool and a side surface of a punch is set to 1.33 mm by using the out-of-plane deformation restricting tool, FIG. 14B illustrates a case where the gap between the out-of-plane deformation restricting tool and the side surface of the punch is set to 1.41 mm by using the out-of-plane deformation restricting tool, and FIG. 14C illustrates a case where the out-of-plane deformation tool is not used.

Figure 15:
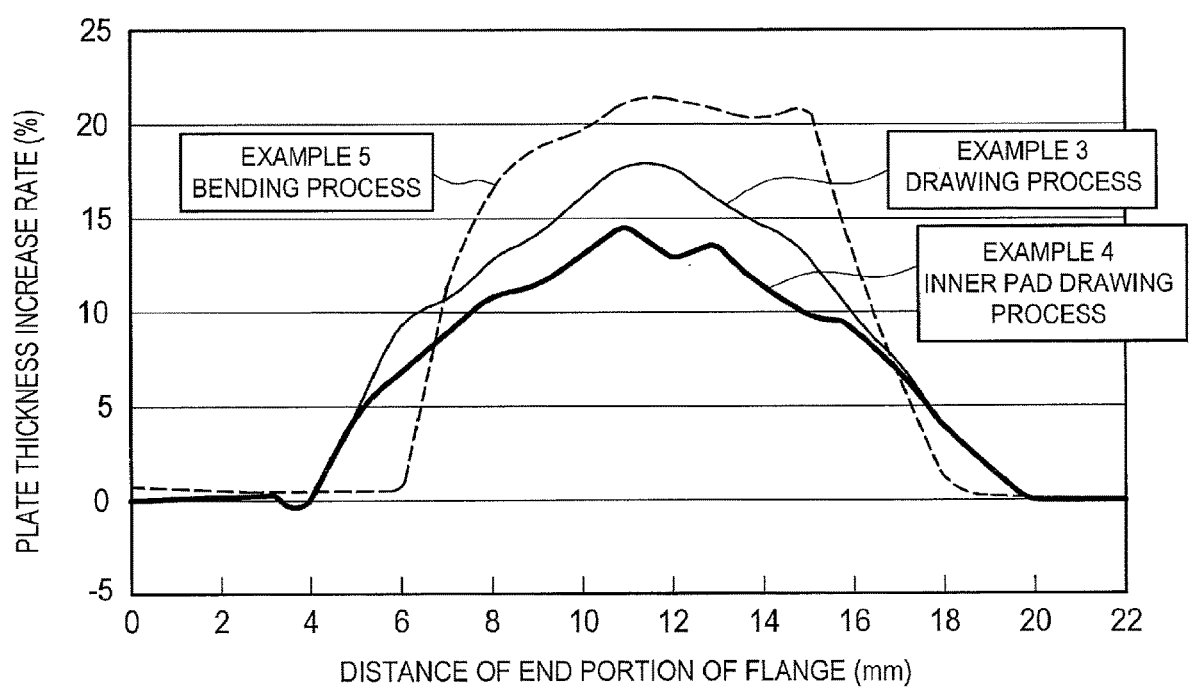

FIG. 15 is a graph illustrating a distribution of a plate thickness increase rate of an edge portion of a ridge-portion flange of a press-molded product produced by a first press-molding step using a drawing process, an inner pad drawing process, and a bending process after a first intermediate step as a bending process.

Figure 16:
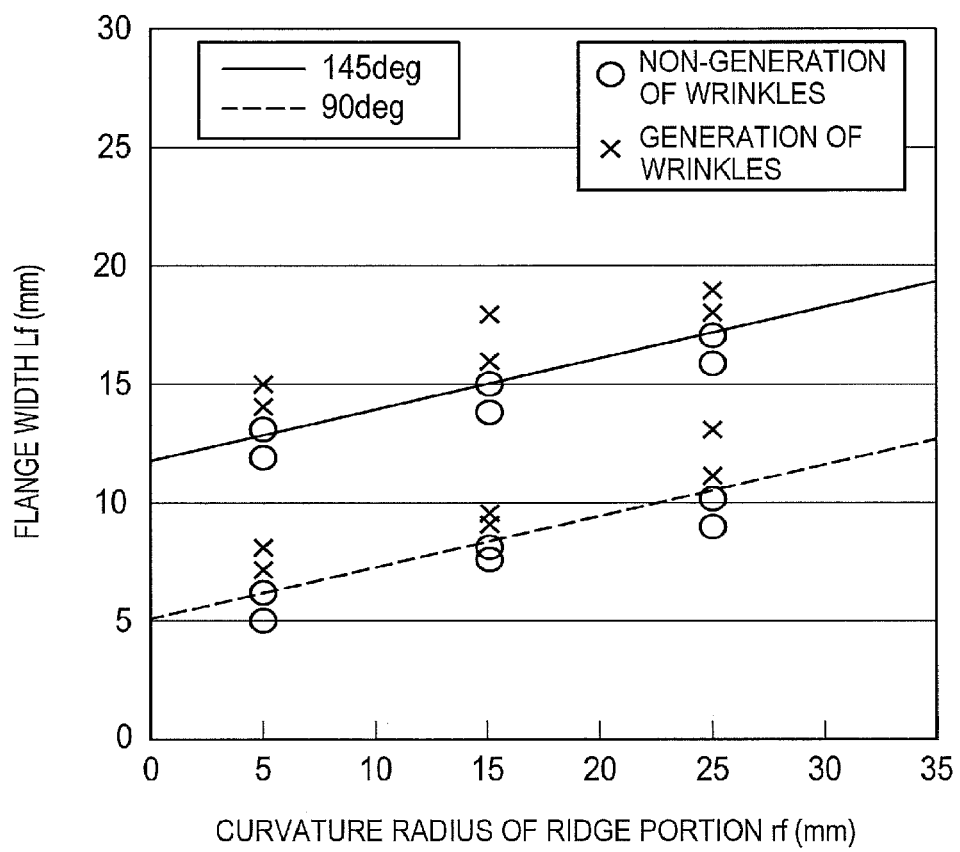

FIG. 16 is a graph illustrating wrinkles generated depending on a flange width Lf, a curvature radius rf of a ridge portion, and an angle θ between a first surface portion and a second surface portion.

MODE(S) FOR CARRYING OUT THE INVENTION

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. First Embodiment

First, a press-molded product according to a first embodiment of the invention will be described.

(1-1. Entire Configuration)

The press-molded product according to the embodiment is a molded product obtained by press-molding a steel plate. Such a press-molded product 100 is suitable for, for example, a vehicle body reinforcing member such as a bumper reinforcement, a locker (side sill), a beltline, and a cross member. The press-molded product 100 used for such an application may be obtained by press-molding a high-strength steel plate having a tensile strength of 340 MPa or more and desirably 590 MPa or more. The tensile strength is a value measured by the tensile test based on JIS Z 2241. Further, the plate thickness of the blank formed by the steel plate may be, for example, in the range of 0.8 to 2.0 mm.

Figure 1A:
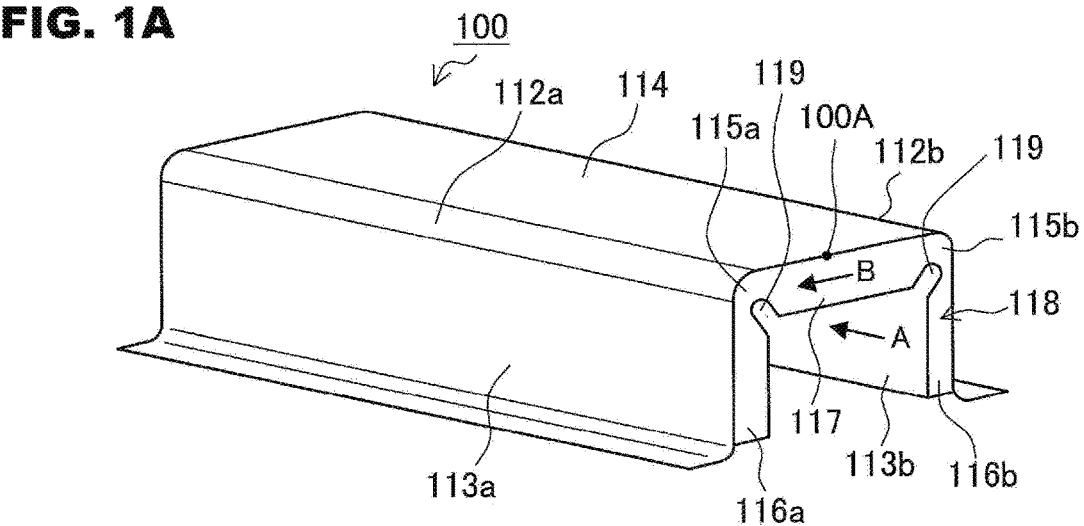
FIG. 1A is an explanatory diagram schematically illustrating a press-molded product having a hat-shaped cross-section according to a first embodiment of the invention.
Figure 1B:
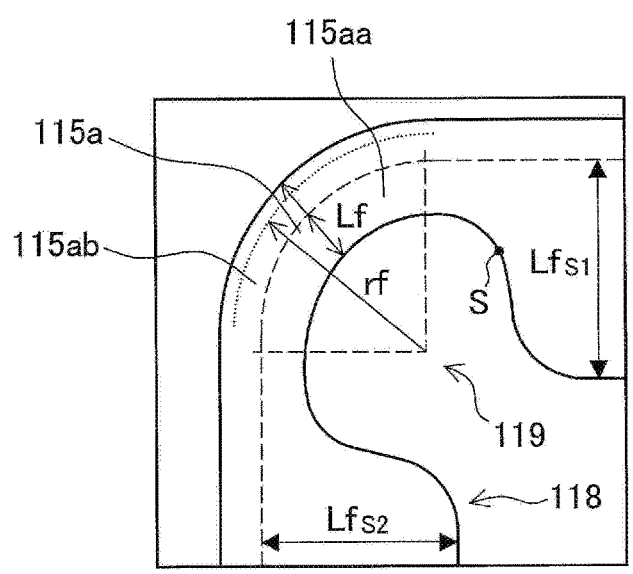
FIG. 1B is a view in the direction A of FIG. 1A.
Figure 1C:
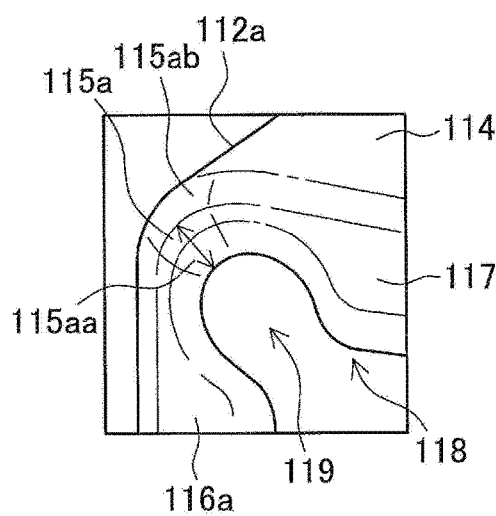
FIG. 1C is a view in the direction B of FIG. 1A.

FIG. 1A is a perspective view schematically illustrating the press-molded product 100 according to the embodiment. Further, FIG. 1B is a view (a front view of a ridge-portion flange 115a) in the direction A of FIG. 1A. FIG. 1C is a view (a perspective view of the ridge-portion flange 115a) in the direction B of FIG. 1A. In the embodiment, the longitudinal direction of the press-molded product 100 or the blank corresponds to the extension direction of the ridge portions 112a and 112b of the press-molded product 100, but the extension direction of the ridge portions 112a and 112b is not limited to the longitudinal direction of the press-molded product 100.

Further, in the embodiment, a predetermined direction in which the ridge portions 112a and 112b extend is not limited to a direction which is recognized as a straight line. A direction which is recognized as a curved shape (curve) other than the straight line found in many vehicle body reinforcing members is also included in the predetermined direction. When the predetermined direction is recognized as a curve, the predetermined direction includes, for example, a direction which is curved in the left and right direction or the up and down direction of the reinforcing member or a direction obtained by the combination of these directions. Further, the entire length in the predetermined direction includes, for example, all kinds of length from the length of about 1000 mm of a bumper or a side member to the length of about 100 mm of a cubic bulkhead.

Figure 2A:
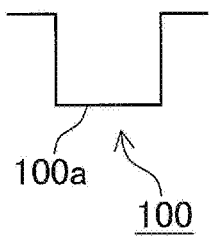
FIGS. 2A-2D are explanatory diagrams illustrating examples of cross-section shapes of press-molded products of the same embodiment.
Figure 2B:
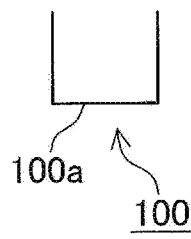
Figure 2C:
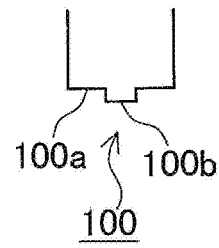
Figure 2D:
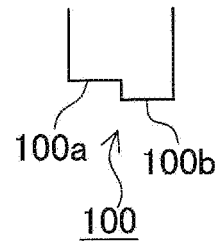

FIGS. 2A-2D are explanatory diagrams illustrating an example of a cross-section shape of the press-molded product 100 in a cross-section orthogonal to the longitudinal direction of the press-molded product 100. The cross-section shape of the press-molded product 100 according to the embodiment can be set to a hat-shaped cross-section illustrated in FIG. 2A or a groove-shaped cross-section illustrated in FIG. 2B, but the invention is not limited thereto. As illustrated in FIG. 2C or FIG. 2D, the cross-section shape of the press-molded product 100 includes a cross-section shape in which a convex shape 100b or a concave shape (not illustrated) is provided in a wall surface 100a in a hat-shaped or groove-shaped cross-section.

Further, the cross-section shape of the press-molded product 100 also includes, for example, a substantially hollow-square-shaped closed cross-section shape other than the opened cross-section shapes illustrated in FIGS. 2A-2D. In addition, the press-molded product 100 is not limited to these cross-section shapes. For example, a press-molded product having a cross-section shape including a ridge portion and a first surface portion and a second surface portion respectively extending from both ends of the ridge line formed by the ridge portion and called a V-shaped cross-section may be used. The press-molded product 100 illustrated in FIG. 1A is the press-molded product 100 having a hat-shaped cross-section. Hereinafter, the press-molded product 100 having a hat-shaped cross-section will be described as an example.

As illustrated in FIG. 1A, the press-molded product 100 includes the ridge portions 112a and 112b, the first surface portions 113a and 113b, and the second surface portion 114. Both ridge portions 112a and 112b are formed so as to extend in the longitudinal direction of the press-molded product 100. One first surface portion 113a is connected to the ridge portion 112a and is formed so as to extend in the first direction intersecting the longitudinal direction of the press-molded product 100. The other first surface portion 113b is connected to the ridge portion 112b and is formed so as to extend in the first direction intersecting the longitudinal direction of the press-molded product 100. The first direction as the extension direction of one first surface portion 113a and the first direction as the extension direction of the other first surface portion 113b may be different from each other.

The second surface portion 114 is connected to the ridge portions 112a and 112b and is formed so as to intersect the longitudinal direction of the press-molded product 100 and to extend in a second direction different from the first direction. The second surface portion 114 is formed between the ridge portions 112a and 112b. In this way, the press-molded product 100 has a substantially hat-shaped opened cross-section including the ridge portions 112a and 112b which extend in the longitudinal direction of the press-molded product 100 and including the first surface portions 113a and 113b and the second surface portion 114 which are continuous to the ridge portions 112a and 112b.

In order to apply the press-molded product 100 molded by a high-strength steel plate to, for example, a vehicle body reinforcing member, it is desirable that the curvature radius rf of each of ridge portions 112a and 112b be in the range of 0 mm to 35 mm. The curvature radius of the ridge portion indicates the curvature radius of the inner surface of the ridge portion. Further, in order to apply the press-molded product 100 to, for example, the vehicle body reinforcing member, it is desirable that an angle formed between each of first surface portions 113a and 113b and a second surface portion 114 be in the range of 90° to 145°.

(1-2. Inward Continuous Flange)

The press-molded product 100 includes the ridge-portion flanges 115a and 115b, the first flanges 116a and 116b, and the second flange 117 provided in at least one outer end portion 100A in the longitudinal direction. The ridge-portion flanges 115a and 115b are formed at the outer end portion 100A in the longitudinal direction of the ridge portions 112a and 112b. The first flanges 116a and 116b are formed in at least a part of the area of the outer end portion 100A in the longitudinal direction of the first surface portions 113a and 113b. Further, the second flange 117 is formed in at least a part of the area of the outer end portion 100A in the longitudinal direction of the second surface portion 114. In the embodiment, the first flanges 116a and 116b and the second flange 117 are formed in the entire area of the outer end portion 100A of each of the first surface portions 113a and 113b and the second surface portion 114.

The ridge-portion flanges 115a and 115b, the first flanges 116a and 116b, and the second flange 117 are all formed continuously as the inward flange. The ridge-portion flanges 115a and 115b, the first flanges 116a and 116b, and the second flange 117 constitute the inward continuous flange 118. Since the flange provided in the end portion of the press-molded product 100 is formed as the inward continuous flange 118, for example, the cross-section of the vehicle body reinforcing member can be enlarged to the fullest extent of the design cross-section. Thus, it is possible to further improve the bonding strength between the reinforcing member and the other member or the rigidity of the vehicle body.

The press-molded product 100 according to the embodiment includes the inward continuous flange 118 provided in the longitudinal outer end portion 100A so as to be continuous in the entire length of the first surface portions 113a and 113b, the ridge portions 112a and 112b, and the second surface portion 114. Here, the first flanges 116a and 116b and the second flange 117 may be continuous to the ridge-portion flanges 115a and 115b and the inward continuous flange 118 is not necessarily continuous in the entire length. For example, the first flanges 116a and 116b or the second flange 117 may be formed in a part of the area of the outer end portion 100A of the first surface portions 113a and 113b or the second surface portion 114. When the second flange 117 is not formed in the entire area of the second surface portion 114, two divided inward continuous flanges 118 are formed.

(1-3. Ridge-portion Flange)

In the press-molded product 100 according to the embodiment, a concave portion 119 where a flange width is small is provided in each of the ridge-portion flanges 115a and 115b. Accordingly, the width Lf of each of the ridge-portion flanges 115a and 115b is smaller than the widths Lfs1 and Lfs2 of each of the first flanges 116a and 116b and the second flange 117 in the vertex of each of the ridge portions 112a and 112b. The width of the flange indicates a flat portion except for a curved portion formed in the base portion in which the flange is uprightly formed from the ridge portion, the first surface portion, or the second surface portion. For example, in the ridge-portion flange 115a, as illustrated in FIG. 1B, the width Lf of the ridge-portion flange 115a indicates the width Lf of a flat portion 115aa except for a curved portion 115ab formed so as to be continuous to the ridge portion 112a in the longitudinal outer end portion 100A.

Since the width Lf of each of the ridge-portion flanges 115a and 115b is smaller than the widths of the first flanges 116a and 116b and the second flange 117, the extra extension amount of the front end of the flange of each of the ridge-portion flanges 115a and 115b is small, and hence the generation of wrinkles is reduced. Particularly, the press-molded product 100 according to the embodiment is suitable for the vehicle body reinforcing member, and is molded by using a high-strength steel plate. In order to suppress the generation of wrinkles in ridge-portion flanges 115a and 115b of the press-molded product 100 obtained by such a high-strength steel plate, the width Lf (mm) of a flat portion 115aa of each of the ridge-portion flanges 115a and 115b satisfies Equation (1) as below.

$$Lf \leq 0.22 \times rf + 0.13 \times \theta - 5.9 \qquad (1),$$

rf (mm): curvature radius of ridge portion 112a (112b) (curvature radius of inner surface of ridge portion)

θ: angle formed between first surface portion 113a (113b) and second surface portion 114

(here, 0 mm ≤ rf ≤ 35 mm and 90° ≤ θ ≤ 145°)

When the width Lf of each of the ridge-portion flanges 115a and 115b exceeds a range defined by Equation (1), the extra extension of the edge portions of the ridge-portion flanges 115a and 115b increases, and hence wrinkles are easily generated. Here, in order to ensure the strength of the press-molded product 100 suitable for the vehicle body reinforcing member, it is desirable that the width Lf of each of the ridge-portion flanges 115a and 115b satisfy the relation of Lf ≥ 0.2 rf.

In addition, when the flange width Lf of each of the ridge-portion flanges 115a and 115b is set to be smaller than the flange widths Lfs1 and Lfs2 of the first flanges 116a and 116b and the second flange 117, the flange width Lf of at least a part of the ridge-portion flanges 115a and 115b may be smaller than the flange widths Lfs1 and Lfs2 of at least a part of the first flanges 116a and 116b and the second flange 117. That is, when a concave portion 119 is formed inside the ridge-portion flanges 115a and 115b, the flange width Lf of a part of the ridge-portion flanges 115a and 115b may be smaller than the flange widths Lfs1 and Lfs2 of the first flanges 116a and 116b and the second flange 117. Further, when the concave portion 119 is formed throughout the first flanges 116a and 116b and the second flange 117, the flange widths Lfs1 and Lfs2 of a part of the first flanges 116a and 116b and the second flange 117 may be equal to the flange width Lf of the ridge-portion flanges 115a and 115b.

Further, it is desirable that the plate thickness of an edge portion of an inward continuous flange 118 in the width direction be equal to or larger than the plate thickness obtained before a press-molding process. Since the edge portion of the inward continuous flange 118 has such a plate thickness, it is possible to improve the rigidity or the load transfer strength of the press-molded product 100 used as the vehicle body reinforcing member.

Further, it is desirable that the plate thickness of the edge portion of the inward continuous flange 118 in the width direction be equal to or smaller than 1.5 times the plate thickness obtained before the press-molding process. Particularly, it is desirable that the plate thickness of each of the edge portions of the ridge-portion flanges 115a and 115b be equal to or smaller than 1.5 times the plate thickness obtained before a press-molding process. Since the edge portion of the inward continuous flange 118 has such a plate thickness, it is possible to decrease a gap of an overlapping portion causing poor welding when a welding process such as spot-welding is performed while the inward flange serving as a bonding margin overlaps the other member. Thus, it is possible to maintain a sufficient bonding strength when the press-molded product 100 used as the vehicle body reinforcing member is bonded to the other member.

As described above, in the press-molded product 100 according to the embodiment, a notch is not formed in the ridge-portion flanges 115a and 115b and there are no wrinkles in the inward continuous flange 118. Thus, when the press-molded product 100 is used as, for example the vehicle body reinforcing member, it is possible to improve the bonding strength between the press-molded product 100 and the other member and to improve the performance involved with the rigidity or the load transfer efficiency of the reinforcing member.

2. Second Embodiment

Next, an example of a method of producing the press-molded product 100 according to a second embodiment of the invention will be described along with a configuration example of an apparatus of producing the press-molded product 100. A method and an apparatus of producing the press-molded product 100 according to the embodiment are used to produce, for example, the press-molded product 100 according to the first embodiment. A method of producing the press-molded product 100 according to the embodiment includes a first intermediate molding step and a first press-molding step.

(2-1. First Intermediate Molding Step)

Figure 3A:
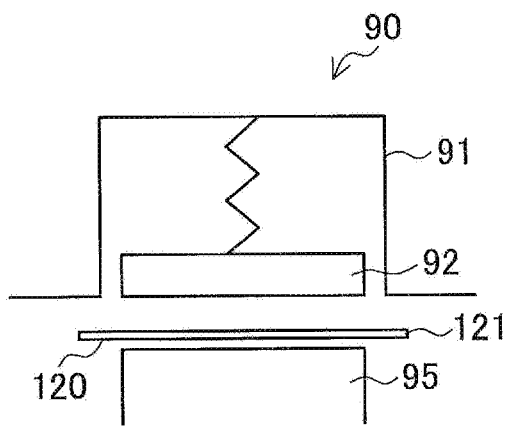
FIG. 3A and FIG. 3B are explanatory diagrams schematically illustrating a state where a blank is press-molded into a first intermediate member in press-molded product producing method of a second embodiment, where
Figure 3B:
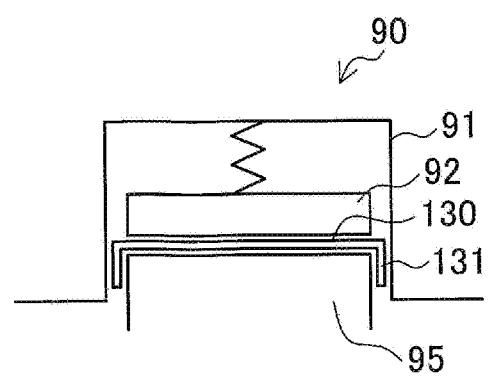

First, a press-molding method performed in a first intermediate molding step of obtaining a first intermediate member 130 from a blank 120 formed by a steel plate and a press-molding apparatus used in the corresponding step will be described. FIG. 3A and FIG. 3B are explanatory diagrams schematically illustrating a state where the first intermediate member 130 is obtained from the blank 120 by a press-molding process. FIG. 3A illustrates a state where the blank 120 is set in a press-molding apparatus 90. FIG. 3B illustrates a state where the press-molding process ends.

As illustrated in FIG. 3A, the blank 120 is set in the press-molding apparatus 90, and then the blank 120 is nipped between a punch 95 and a pad 92 attached to a die 91 so as to be movable in the mold clamping direction. Next, as illustrated in FIG. 3B, when the die 91 moves downward, both longitudinal end portions 121 of the blank 120 are bent by the die 91. By such a bending process, it is possible to obtain the first intermediate member 130 having a flange 131 at both longitudinal end portions of the blank 120.

Here, an example is described in which both longitudinal end portions 121 of the blank 120 are bent, but any one of both longitudinal end portions 121 may be bent. The press-molding apparatus 90 used in the first intermediate molding step may be a known press-molding apparatus 90 which performs a bending process by including the punch 95 and the die 91 having the pad 92 attached thereto so as to be movable in the mold clamping direction.

(2-2. First Press-Molding Step)

Next, a press-molding method performed in a first press-molding step of obtaining the press-molded product 100 from the first intermediate member 130 and a press-molding apparatus used in the first press-molding step will be described.

(2-2-1. Press-Molding Apparatus)

Figure 4:
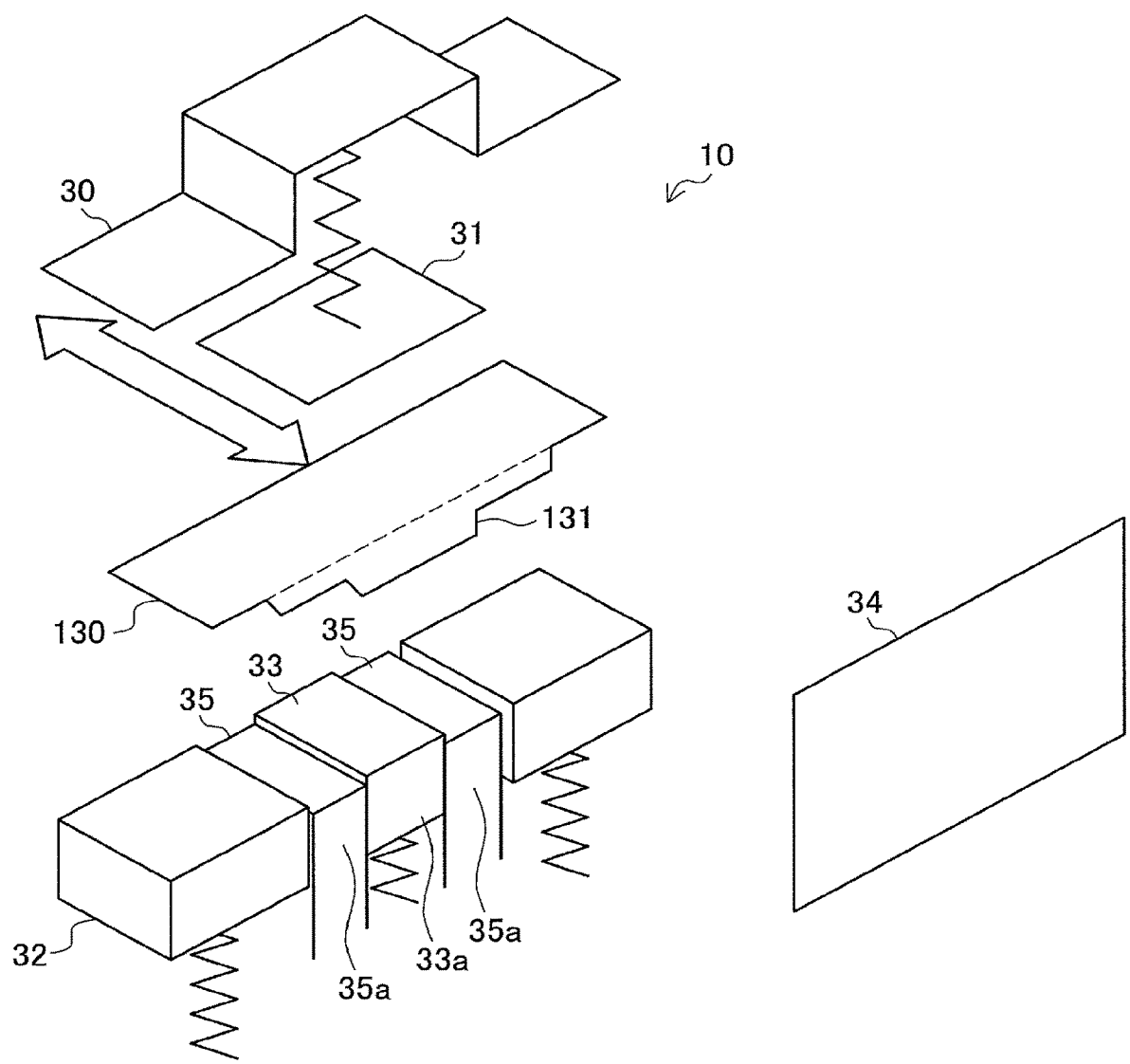
FIG. 4 is a schematic diagram illustrating a configuration example of a press-molding apparatus used for a drawing process.

FIG. 4 is a schematic diagram illustrating a part of a configuration example of a press-molding apparatus 10 used in the first press-molding step. The press-molding apparatus used in the first press-molding step corresponds to one type of a press-molded product producing apparatus of the invention. In addition, FIG. 4 partially illustrates the press-molding apparatus 10 in the periphery of the end portion of the blank 120 in the longitudinal direction (a direction indicated by the white arrow of FIG. 4).

As illustrated in FIG. 4, the press-molding apparatus 10 includes a die 30, a blank holder 32, a punch 35, a pad 31, and an inner pad 33. The die 30 and the blank holder 32 constrain and hold the end portions of the blank 120 (depicted in FIG. 3) in the width direction intersecting the longitudinal direction thereof. The pad 31 is supported by the die 30 so as to be movable in the mold clamping direction. The inner pad 33 is supported by the punch 35 so as to be movable in the mold clamping direction. Further, the width of the inner pad 33 in a direction intersecting the longitudinal direction of the first intermediate member 130 is set to be smaller than the width of the punch 35 in the same direction. Thus, the pad 31 and the inner pad 33 constrain the center portion of the blank 120 (depicted in FIG. 3) in the width direction. Further, the press-molding apparatus 10 includes an out-of-plane deformation restricting tool 34 which is disposed so as to face a side surface 35a of the punch 35 and a side surface 33a of the inner pad 33 during a press-molding process. In FIG. 4, for example, only the surface of the die 30 or the out-of-plane deformation restricting tool 34 is schematically illustrated.

All the die 30, the blank holder 32, the punch 35, the pad 31, and the inner pad 33 used for an existing press-molding apparatus performing such a drawing process may be used. Thus, the description thereof will be omitted herein. The out-of-plane deformation restricting tool 34 is disposed between the side surfaces 33a and 35a with a gap (a first gap) of a predetermined distance therebetween so as to face the side surface 35a of the punch 35 and the side surface 33a of the inner pad 33 during a press-molding process.

During the press-molding process, the press-molding process is performed while the flange 131 formed in the first intermediate member 130 is nipped in the gap (the first gap) formed between each of the side surface 35a of the punch 35 and the side surface 33a of the inner pad 33, and the out-of-plane deformation restricting tool 34. Thus, an increase or a change in the plate thickness of the flange 131 is restricted, and hence the generation of wrinkles is suppressed. The distance of the gap may be, for example, a value obtained by adding a predetermined clearance to the plate thickness of the flange 131. For example, the gap may be provided so as to satisfy Equation (2) as below.

$$1.00 \times t \leq x < 1.40 \times t \tag{2}$$

t: plate thickness (mm) of blank
x: distance (mm) of gap

Since the distance x of the gap satisfies Equation (2) above, the out-of-plane deformation of the flange 131 can be reliably suppressed without setting the plate thickness of the flange 131 to be smaller than the plate thickness obtained before a press-molding process. Particularly, the out-of-plane deformation of the ridge-portion flanges 115a and 115b easily causing the generation of wrinkles is suppressed.

At this time, in order to suppress the die-galling during the press-molding process, a slight clearance may be provided between the surface of the flange 131 and the out-of-plane deformation restricting tool 34. Further, the out-of-plane deformation is easily generated as the plate thickness of the flange 131 decreases. Thus, it is desirable to provide the gap so as to satisfy Equation (3) as below.

$$1.03 \times t \leq x < 1.35 \times t \tag{3}$$

t: plate thickness (mm) of blank
x: distance (mm) of gap

The press-molding apparatus 10 illustrated in FIG. 4 corresponds to a configuration example of the press-molding apparatus 10 having the inner pad 33 provided in the punch 35, but a press-molding apparatus without the inner pad 33 may be used. The press-molding apparatus without such an inner pad 33 may have the same configuration as the press-molding apparatus 10 except that the punch 35 does not include the inner pad 33. In the specification, the press-molding apparatus without the inner pad 33 will be simply referred to as a "drawing device" and the press-molding apparatus with the inner pad 33 will be referred to as an "inner pad drawing device".

(2-2-2. First Press-Molding Step by Drawing Device)

Next, a state in which a drawing process is performed on the first intermediate member 130 by a drawing device 10A without an inner pad will be described. Since the drawing device 10A is provided such that the inner pad 33 is not provided in the press-molding apparatus 10 illustrated in FIG. 4, a description will be made as below with reference to FIG. 4.

Figure 5A:
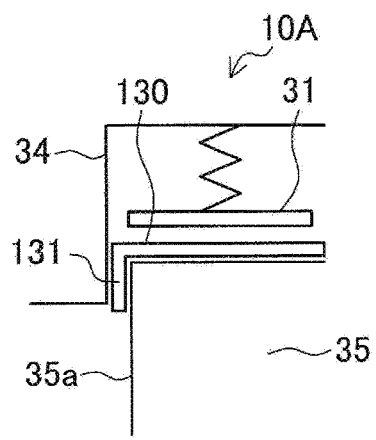
FIGS. 5A-5D are explanatory diagrams schematically illustrating a state where a press-molded product is obtained from a first intermediate member by a drawing process of a drawing device in the press-molded product producing method of the same embodiment.
Figure 5A:
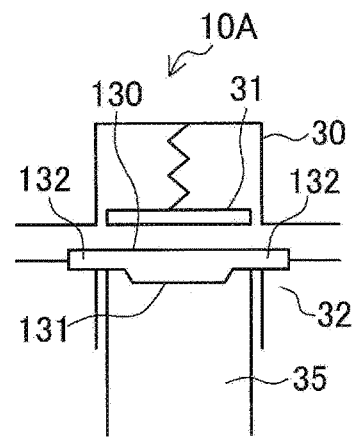
Figure 5B:
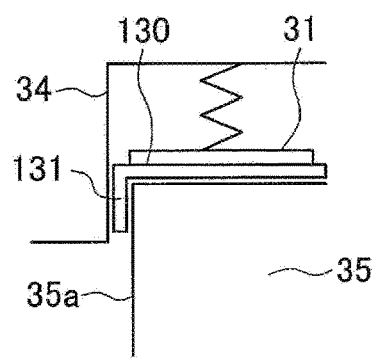
Figure 5B:
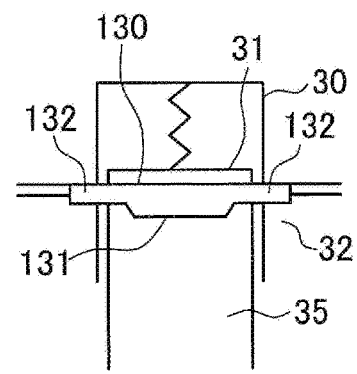
Figure 5C:
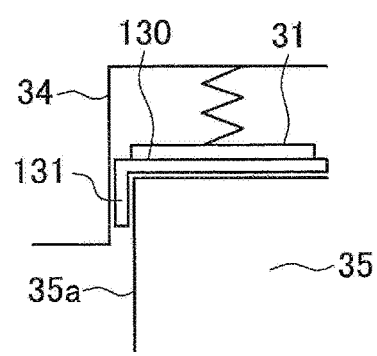
Figure 5C:
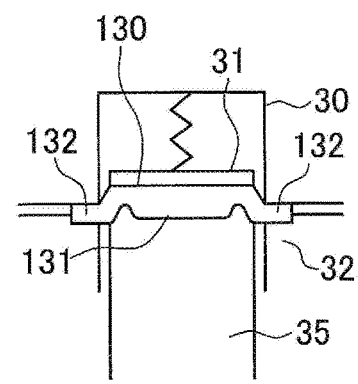
Figure 5D:
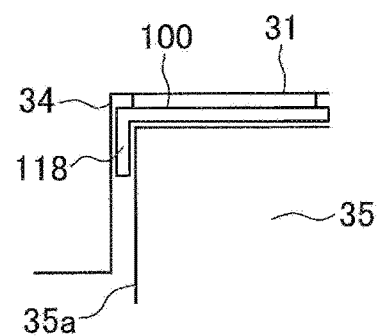
Figure 5D:
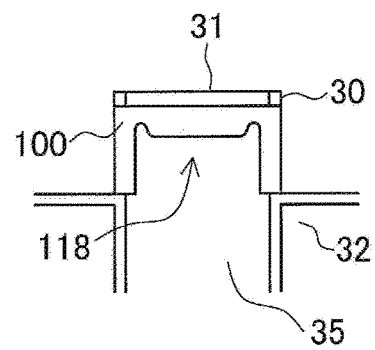

FIGS. 5A-5D are explanatory diagrams schematically illustrating a state where the press-molded product 100 is obtained from the first intermediate member 130 by the drawing process using the drawing device 10A. In FIGS. 5A-5D, the column (a) indicates a diagram when viewed in a direction intersecting the longitudinal direction of the first intermediate member 130 and the column (b) indicates a diagram when viewed in the longitudinal direction of the first intermediate member 130. That is, the flange 131 can be viewed from the front side thereof in the column (b) of FIGS. 5A-5D. Further, FIG. 5A illustrates a state where the first intermediate member 130 is set in the drawing device 10A, and FIG. 5B illustrates a state where the pad 31 contacts the first intermediate member 130. Further, FIG. 5C illustrates a state where a drawing process is being performed and FIG. 5D illustrates a state where the drawing process ends.

As illustrated in FIGS. 5A-5D, in the drawing process, the first intermediate member 130 is set in the drawing device 10A and then the end portion 132 in the width direction intersecting the longitudinal direction of the first intermediate member 130 is constrained and held by the die 30 and the blank holder 32. In this state, the die 30 moves toward the punch 35 while the first intermediate member 130 is nipped between the flat pad 31 which is supported by the die 30 so as to be movable in the mold clamping direction and the punch 35 having a flat top portion. In this way, a drawing process is performed on the first intermediate member 130.

During the drawing process, the flange 131 of the first intermediate member 130 is disposed inside the gap (the first gap) formed by the side surface 35a of the punch 35 and the out-of-plane deformation restricting tool 34 disposed so as to face the side surface 35a of the punch 35. Thus, the flange 131 is constrained by the out-of-plane deformation restricting tool 34 and the side surface 35a of the punch 35 during the drawing process. Accordingly, the out-of-plane deformation of the flange 131 during the drawing process is suppressed, and the ridge-portion flanges 115a and 115b are formed by an in-plane compression molding process. Thus, an increase or a change in the plate thickness of each of the ridge-portion flanges 115a and 115b causing the generation of wrinkles decreases.

As described above, the gap is provided between the side surface 35a of the punch 35 and the out-of-plane deformation restricting tool 34 so as to satisfy Equation (2) as below.

$$1.00 \times t \leq x < 1.40 \times t \quad (2)$$

t: plate thickness (mm) of blank
x: distance (mm) of gap

Since Equation (2) is satisfied, it is possible to reliably suppress the out-of-plane deformation of the inward continuous flange 118 obtained by continuously forming the first flange 116a (116b), the ridge-portion flange 115a (115b), and the second flange 117. Particularly, it is possible to suppress the out-of-plane deformation of the ridge-portion flanges 115a and 115b easily causing the generation of wrinkles.

Further, as described above, it is desirable that the gap satisfy Equation (3) as below in order to suppress the die-galling during the press-molding process and the out-of-plane deformation in the case of a thin plate thickness of the flange 131.

$$1.03 \times t \leq x < 1.35 \times t \quad (3)$$

t: plate thickness (mm) of blank
x: distance (mm) of gap

In the example illustrated in FIGS. 5A-5D, the out-of-plane deformation restricting tool 34 is integrated with the die 30, but the configuration of the out-of-plane deformation restricting tool 34 is not limited to this example. As long as the out-of-plane deformation restricting tool 34 can constrain the flange 131 of the first intermediate member 130, the installation position of the out-of-plane deformation restricting tool 34 is not limited to a specific position. Further, the invention is not limited to the configuration in which the out-of-plane deformation restricting tool 34 is disposed on the upper die as in the example of the embodiment, but the out-of-plane deformation restricting tool may be disposed in the lower die. Further, the invention is not limited to the configuration in which the out-of-plane deformation restricting tool 34 constrains the flange 131 in collaboration with the side surface 35a of the punch 35, but the out-of-plane deformation restricting tool 34 may independently constrain the flange 131.

By the drawing process performed by such a drawing device 10A, as illustrated in FIGS. 1A-1C, the press-molded product 100 including the ridge portions 112a and 112b, the first surface portions 113a and 113b, the second surface portion 114, and the inward continuous flange 118 is molded. At this time, since the drawing process is performed while the flange 131 is nipped by the side surface 35a of the punch 35 and the out-of-plane deformation restricting tool 34, the generation of wrinkles of the formed inward continuous flange 118 is suppressed without forming a notch in the flange 131.

In addition, in the description above, the press-molded product 100 having the inward continuous flange 118 continuously formed in the entire area of the longitudinal outer end portions 100A of the first surface portions 113a and 113b, the ridge portions 112a and 112b, and the second surface portion 114 has been described. Here, the first flanges 116a and 116b may be formed in a part of outer end portions 100A of the first surface portions 113a and 113b instead of the entire area thereof. Further, the second flange 117 may be formed in a part of the outer end portion 100A of the second surface portion 114 instead of the entire area thereof. That is, the first flanges 116a and 116b, and the second flange 117 may be formed so as to be respectively continuous to the ridge-portion flanges 115a and 115b.

(2-2-3. First Press-Molding Step by Inner Pad Drawing Device)

Next, a state where an inner pad drawing process is performed on the first intermediate member 130 by an inner pad drawing device 10B will be described. FIGS. 6A-6F are explanatory diagrams schematically illustrating a state where the press-molded product 100 is obtained from the first intermediate member 130 by the inner pad drawing process using the inner pad drawing device 10B. In FIGS. 6A-6F, the column (a) indicates a diagram when viewed in a direction intersecting the longitudinal direction of the first intermediate member 130, and the column (b) indicates a diagram when viewed in the longitudinal direction of the first intermediate member 130.

Figure 6A:
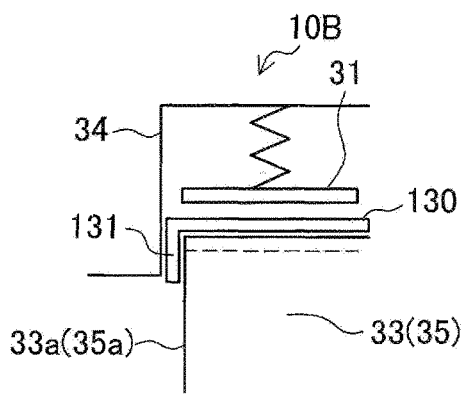
FIGS. 6A-6E are explanatory diagrams schematically illustrating a state where a press-molded product is obtained from a first intermediate member by an inner pad drawing process in the press-molded product producing method of the same embodiment.
Figure 6A:
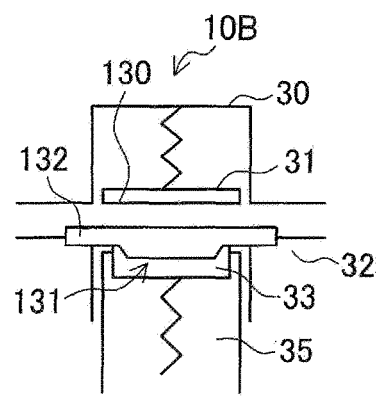
Figure 6B:
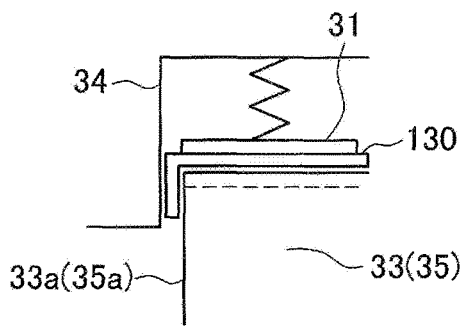
Figure 6B:
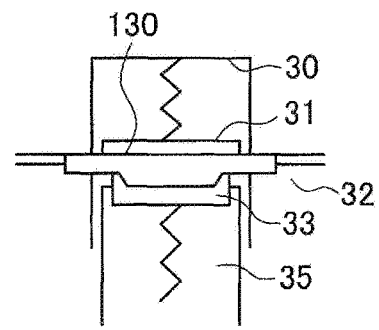
Figure 6C:
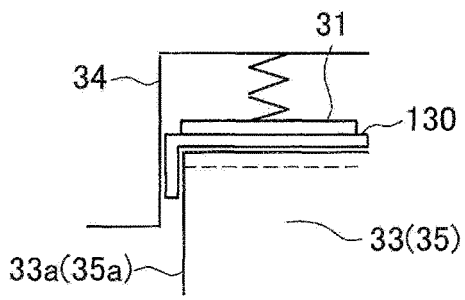
Figure 6C:
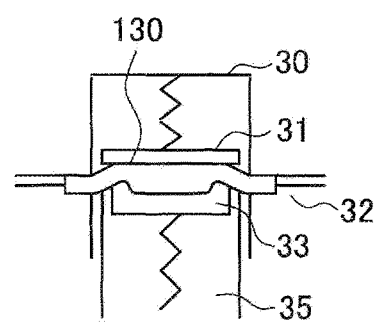
Figure 6D:
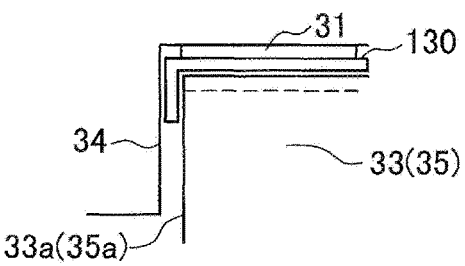
Figure 6D:
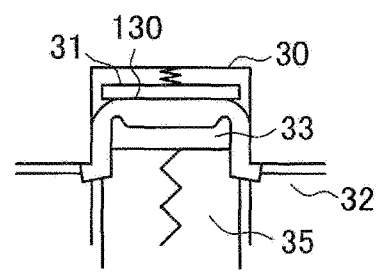
Figure 6E:
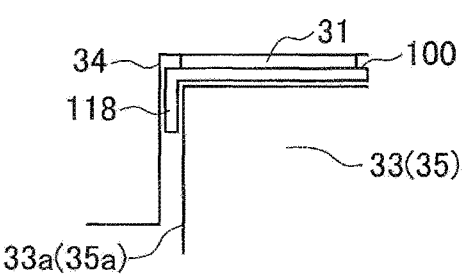
Figure 6E:
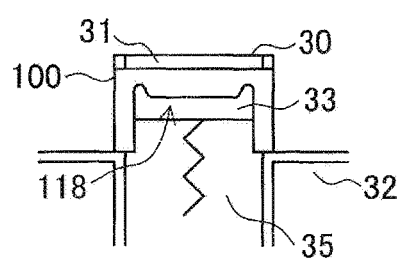

Further, FIG. 6A illustrates a state where the first intermediate member 130 is set in the inner pad drawing device 10B, and FIG. 6B illustrates a state where the pad 31 contacts the first intermediate member 130. Further, FIG. 6C illustrates a state where an inner pad drawing process is being performed, FIG. 6D illustrates a state immediately before the inner pad drawing process ends, and FIG. 6E illustrates a state where the inner pad drawing process ends. In addition, the signs of FIGS. 6A-6F are the same as those of FIGS. 5A-5D except that the inner pad 33 is added.

As illustrated in FIGS. 6A-6F, the inner pad drawing process can be performed similarly to the drawing process illustrated in FIGS. 5A-5D except that the drawing process is performed by the punch 35 with the inner pad 33 supported so as to be movable in the mold clamping direction. Thus, the flange 131 is nipped by the side surface 35*a* of the punch 35, the side surface 33*a* of the inner pad 33, and the out-of-plane deformation restricting tool 34 during the inner pad drawing process, and hence the out-of-plane deformation of the flange 131 is suppressed. Accordingly, the ridge-portion flanges 115*a* and 115*b* are formed by the in-plane compression molding process. Also, since the punch 35 with the inner pad 33 is used, an increase in the plate thickness of the edge portion of the inward continuous flange 118, particularly, an increase in plate thickness of the edge portion of each of the ridge-portion flanges 115*a* and 115*b* is reduced, and the generation of wrinkles is further suppressed.

Figure 7A:
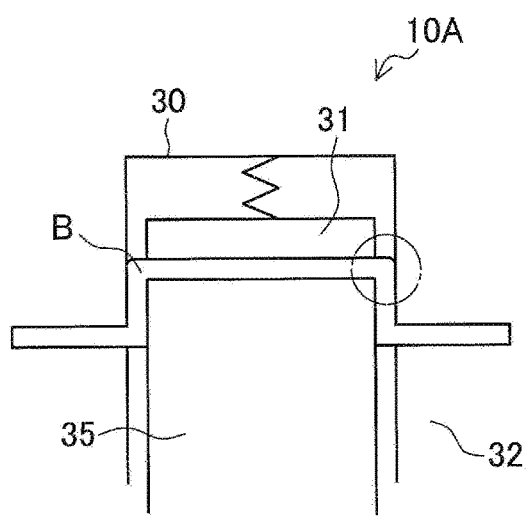
FIGS. 7A-7B are explanatory diagrams schematically illustrating the curvature radius of a portion molded into a ridge portion during a molding process, where
Figure 7B:
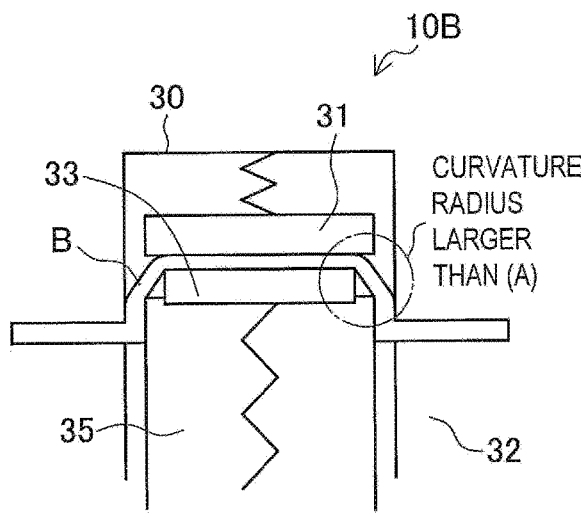

FIGS. 7A-7B are explanatory diagrams schematically illustrating the curvature radius of each of the ridge portions 112*a* and 112*b* formed during a drawing process or an inner pad drawing process. FIG. 7A illustrates a state where a drawing process is performed without the inner pad. FIG. 7B illustrates a state of an inner pad drawing process. As illustrated in FIG. 7B, in the inner pad drawing process, the curvature radius of the curved portion B formed in each of the ridge portions 112*a* and 112*b* during the molding process becomes larger than that of the drawing process illustrated in FIG. 7A. For that reason, it is possible to reduce an increase in the plate thickness of the edge portion of each of the ridge-portion flanges 115*a* and 115*b* formed after the molding process. As a result, the satisfactory inward continuous flange 118 suppressing the generation of wrinkles is formed.

In addition, in the inner pad drawing process illustrated in FIG. 7B, the inner pad 33 moves downward so as to be received inside the punch 35 at the time point when the drawing process ends, and hence the curvature radius of each of the ridge portions 112*a* and 112*b* is defined by the curvature radius of the corner portion of the punch 35. Thus, a difference in curvature radius of the ridge portions 112*a* and 112*b* does not occur compared with the drawing process illustrated in FIG. 7A.

(2-2-3. First Press-Molding by Bending Device)

The first press-molding step described so far is performed by the drawing process, but the first press-molding step may be performed by a bending process instead of the drawing process. FIGS. 8A-8D are explanatory diagrams schematically illustrating a state where the press-molded product 100 is obtained from the first intermediate member 130 by a bending process using a bending device 50 instead of the drawing device 10A or the inner pad drawing device 10B.

Figure 8A:
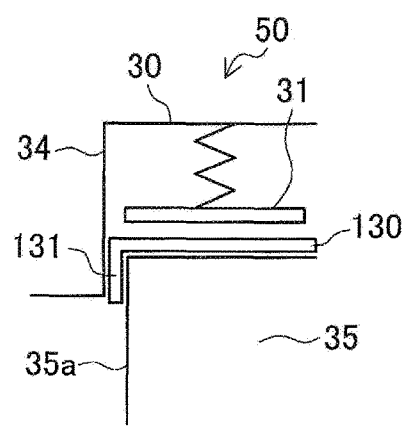
FIGS. 8A-8D are explanatory diagrams schematically illustrating a state where a press-molded product is obtained from a first intermediate member by a bending process instead of a drawing process in the press-molded product producing method of the same embodiment.
Figure 8A:
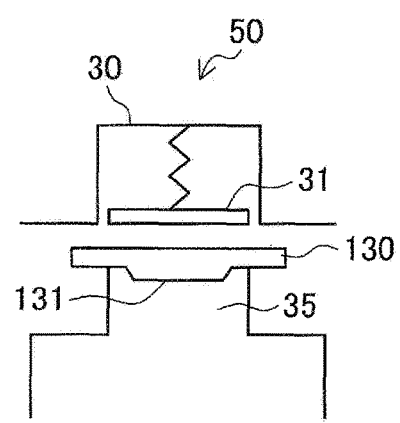
Figure 8B:
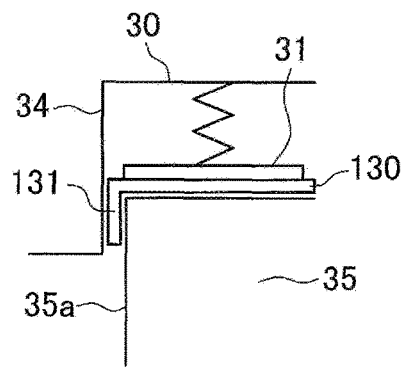
Figure 8B:
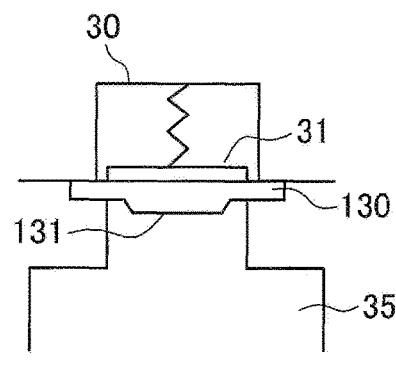
Figure 8C:
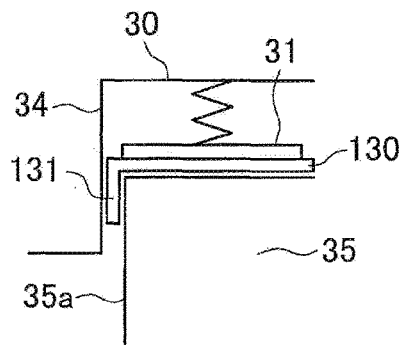
Figure 8C:
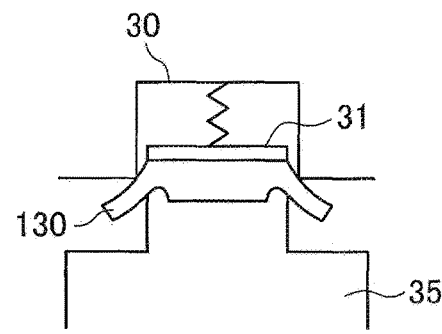
Figure 8D:
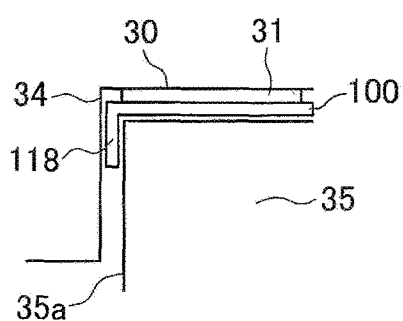
Figure 8D:
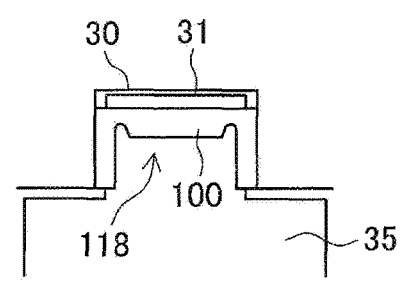

In FIGS. 8A-8D, the column (a) indicates a diagram when viewed in a direction intersecting the longitudinal direction of the first intermediate member 130, and the column (b) indicates a diagram when viewed from the longitudinal direction of the first intermediate member 130. Further, FIG. 8A illustrates a state where the first intermediate member 130 is set in the bending device 50, and FIG. 8B illustrates a state where the pad 31 contacts the first intermediate member 130. Further, FIG. 8C illustrates a state where a bending process is being performed, and FIG. 8D illustrates a state where the bending process ends.

As illustrated in FIGS. 8A-8D, the first intermediate member 130 is set in the bending device 50 in the bending process. At this time, the flange 131 of the first intermediate member 130 is disposed inside the gap (the first gap) formed by the side surface 35*a* of the punch 35, the side surface 33*a* of the inner pad 33, and the out-of-plane deformation restricting tool 34 disposed so as to face the side surfaces 33*a* and 35*a*. Accordingly, the flange 131 of the first intermediate member 130 is constrained by the side surface 35*a* of the punch 35, the side surface 33*a* of the inner pad 33, and the out-of-plane deformation restricting tool 34.

In this state, the die 30 and the punch 35 move close to each other while the first intermediate member 130 is nipped between the pad 31 attached to the die 30 and the punch 35. Accordingly, both ends in the width direction intersecting the longitudinal direction of the first intermediate member 130 are bent. As a result, the out-of-plane deformation of the flange 131 is suppressed during the bending process, and the ridge-portion flanges 115*a* and 115*b* are formed by the in-plane compression molding process.

Such a bending process can be performed by a mold having a simple configuration compared with the drawing process. Meanwhile, in the bending process, a large increase in the plate thickness of the ridge-portion flanges 115*a* and 115*b* easily occurs compared with the drawing process. However, the press-molded product 100 described in the first embodiment can be formed. Here, the drawing process is better than the bending process in that the die-galling of the press-molded product 100 can be reduced and the loss of the mold can be reduced.

As described above, in the press-molded product producing method according to the embodiment, it is possible to produce the press-molded product 100 with the inward continuous flange 118 suppressing the generation of wrinkles without forming a notch by the use of the high-strength steel plate. Thus, it is possible to obtain the press-molded product 100 which can be used in the vehicle body reinforcing member and has high rigidity and excellent load transfer efficiency.

3. Third Embodiment

Next, an example of a method of producing the press-molded product 100 according to a third embodiment of the invention will be described along with a configuration example of a press-molding apparatus. A method of producing the press-molded product 100 according to the embodiment and a press-molding apparatus thereof are used to produce the press-molded product 100 of the first embodiment. The method of producing the press-molded product 100 according to the embodiment includes a first intermediate molding step, a second intermediate molding step, and a second press-molding step. The method of producing the press-molded product 100 according to the embodiment is performed, for example, when the length of each of the first surface portions 113*a* and 113*b* of the press-molded product 100 is long in a direction orthogonal to the extension direction of each of the ridge portions 112*a* and 112*b*. Among these, since the first intermediate molding step is performed similarly to the first intermediate molding step of the second embodiment, the description thereof will be omitted herein.

(3-1. Second Intermediate Molding Step)

Hereinafter, a press-molding method performed in the second intermediate molding step of obtaining a second intermediate member 140 from the first intermediate member 130 and a press-molding apparatus used in the second intermediate molding step will be described. Similarly to the first press-molding step of the second embodiment, the second intermediate molding step may be also performed by any one of the drawing process not using the inner pad and the drawing process using the inner pad.

(3-1-1. Second Intermediate Molding by Drawing Device)

First, a state where a drawing process is performed on the first intermediate member 130 by a drawing device 60 without the inner pad will be described. Similarly to the drawing device 10A used in the first press-molding step, the drawing device 60 may not include the inner pad 33 in the press-molding apparatus 10 illustrated in FIG. 4.

Figure 9A:
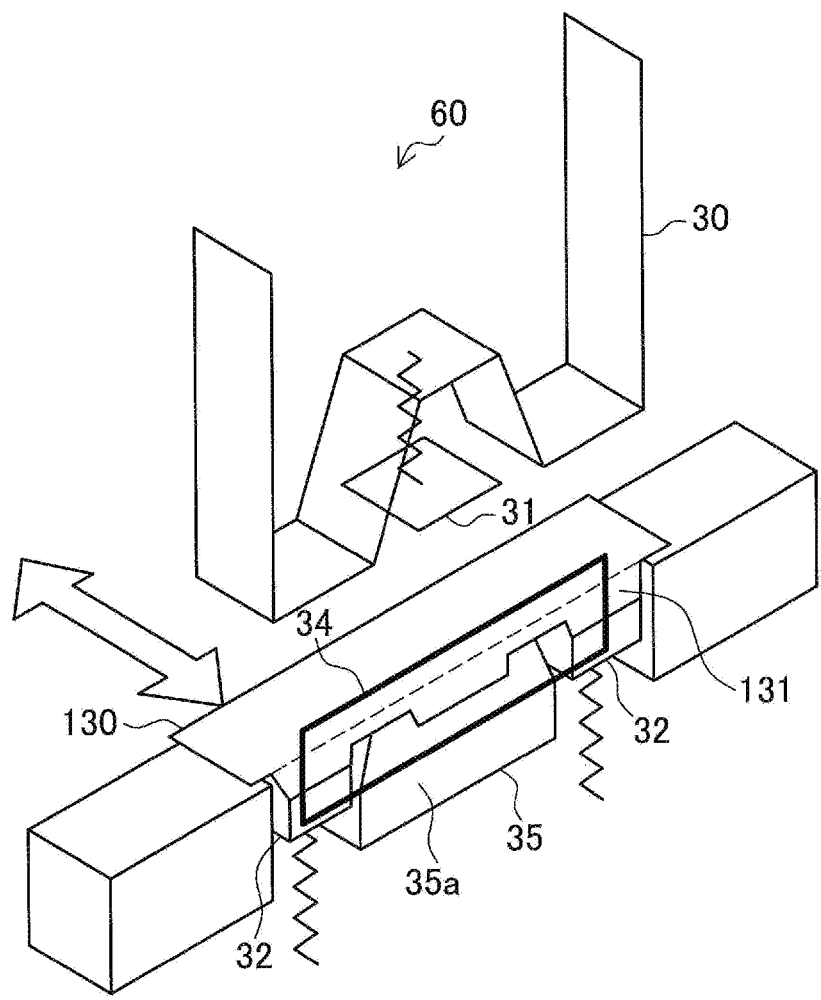
FIG. 9A is an explanatory diagram schematically illustrating a configuration example of a drawing device and FIG. 9B is a picture illustrating an example of the appearance of a second intermediate member obtained by a drawing process.
Figure 9B:
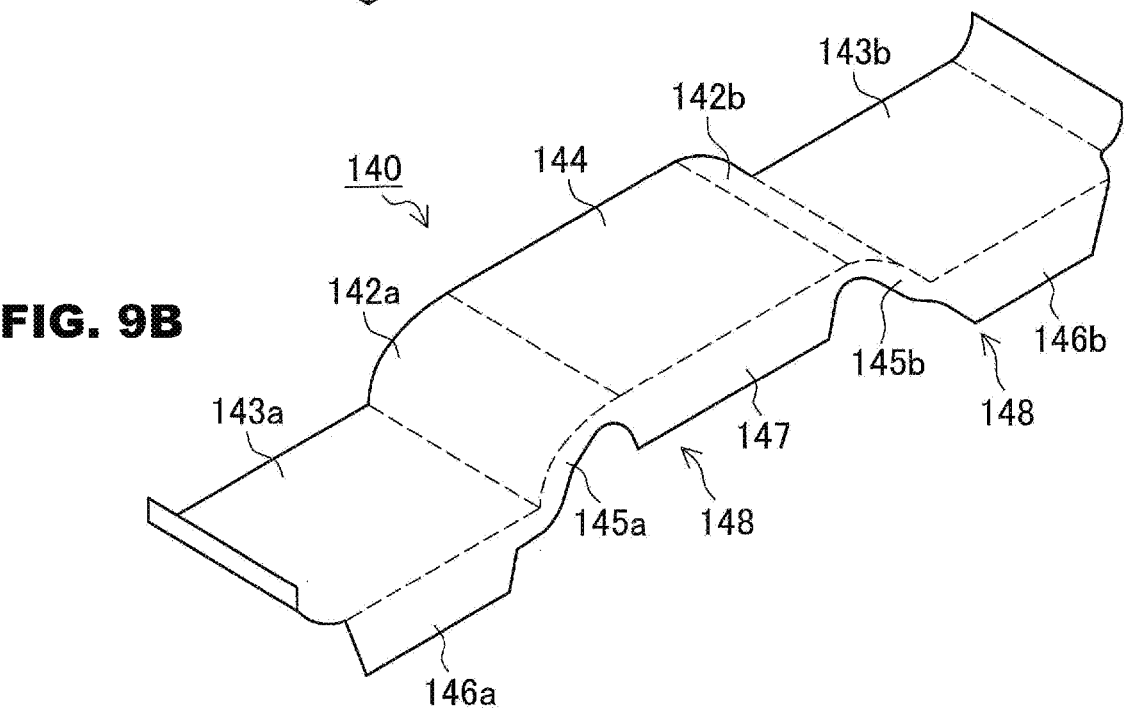

FIG. 9A is a schematic diagram illustrating a part of a configuration example of the drawing device 60. Further, FIG. 9B is a perspective view illustrating an example of the appearance of the second intermediate member 140 obtained by a drawing process using such a drawing device 60. The basic configuration of the drawing device 60 can be the same as that of the drawing device 10A used in the first press-molding step of the second embodiment. In addition, FIG. 9A partially illustrates the drawing device 60 in the periphery of the end portion of the first intermediate member 130 in the longitudinal direction (a direction indicated by the white arrow of FIG. 9A).

FIGS. 10A-10C are explanatory diagrams schematically illustrating a state where the second intermediate member 140 is obtained from the first intermediate member 130 by a drawing process using the drawing device 60. In FIGS. 10A-10C, the column (a) indicates a diagram when viewed in a direction intersecting the longitudinal direction of the first intermediate member 130, and the column (b) indicates a diagram when viewed in the longitudinal direction of the first intermediate member 130. Further, FIG. 10A illustrates a state where the first intermediate member 130 is set in the drawing device 60, FIG. 10B illustrates a state where the pad 31 contacts the first intermediate member 130, and FIG. 10C illustrates a state where a drawing process ends.

As illustrated in FIGS. 10A-10C, the second intermediate molding step using the drawing process can be performed basically similarly to the first press-molding step of the second embodiment. That is, the first intermediate member 130 is set in the drawing device 60 and then the end portion 132 of the first intermediate member 130 is constrained and held by the die 30 and the blank holder 32. In this state, the die 30 moves close to the punch 35 while the first intermediate member 130 is nipped by the flat pad 31 supported by the die 30 so as to be movable in the mold clamping direction and the punch 35 having a flat top portion. Accordingly, a drawing process is performed on the first intermediate member 130. Such a drawing process may be a so-called shallow drawing process.

During such a drawing process, the flange 131 of the first intermediate member 130 is constrained inside the gap (the first gap) formed by the side surface 35a of the punch 35 and the out-of-plane deformation restricting tool 34, and hence the out-of-plane deformation of the flange 131 is suppressed. Here, in the second intermediate molding step, when the die 30 moves close to the punch 35, the movement of the die 30 and the blank holder 32 is stopped halfway while the die 30 is not completely moved close to the punch 35. At this time, the end portion 132 of the first intermediate member 130 nipped by the die 30 and the blank holder 32 is held while not being completely bent.

By such a drawing process, as illustrated in FIG. 9B, intermediate ridge portions 142a and 142b, and first intermediate surface portions 143a and 143b and a second intermediate surface portion 144 respectively connected to the intermediate ridge portions 142a and 142b are formed. In the embodiment, the first intermediate surface portions 143a and 143b are parallel to the second intermediate surface portion 144 in the second intermediate member 140.

Further, the flange 131 formed in the first intermediate member 130 by such a drawing process is molded into an intermediate continuous flange 148 in which intermediate ridge-portion flanges 145a and 145b, first intermediate flanges 146a and 146b, and a second intermediate flange 147 are continuous to one another. The intermediate ridge-portion flanges 145a and 145b are flanges which are formed in the end portions of the intermediate ridge portions 142a and 142b. The first intermediate flanges 146a and 146b are flanges which are formed in at least a part of the area of the longitudinal end portions of the first intermediate surface portions 143a and 143b. The second intermediate flange 147 is a flange which is formed in at least a part of the area of the longitudinal end portion of the second intermediate surface portion 144.

During the drawing process, the flange 131 formed in the first intermediate member 130 is nipped by the side surface 35a of the punch 35 and the out-of-plane deformation restricting tool 34, and hence the out-of-plane deformation of the flange 131 is suppressed. Thus, the intermediate ridge-portion flanges 145a and 145b are formed by an in-plane compression molding process, and hence the generation of wrinkles in the intermediate continuous flange 148 is suppressed.

When the first intermediate member 130 is drawn in this way, it is possible to obtain the second intermediate member 140 including the intermediate ridge portions 142a and 142b, the first intermediate surface portions 143a and 143b, the second intermediate surface portion 144, and the intermediate continuous flange 148. The second intermediate member 140 is also one type of the press-molded product. Thus, the drawing device 60 is one type of the press-molded product producing apparatus of the invention used to produce the press-molded product 100 as a final molded product.

(3-1-2. Second Intermediate Molding by Inner Pad Drawing Device)

Next, a state where a drawing process is performed on the first intermediate member 130 by an inner pad drawing device 70 with an inner pad will be described. The basic configuration of the inner pad drawing device 70 may be the same as that of the inner pad drawing device 10B used in the first press-molding step of the second embodiment.

Figure 11A:
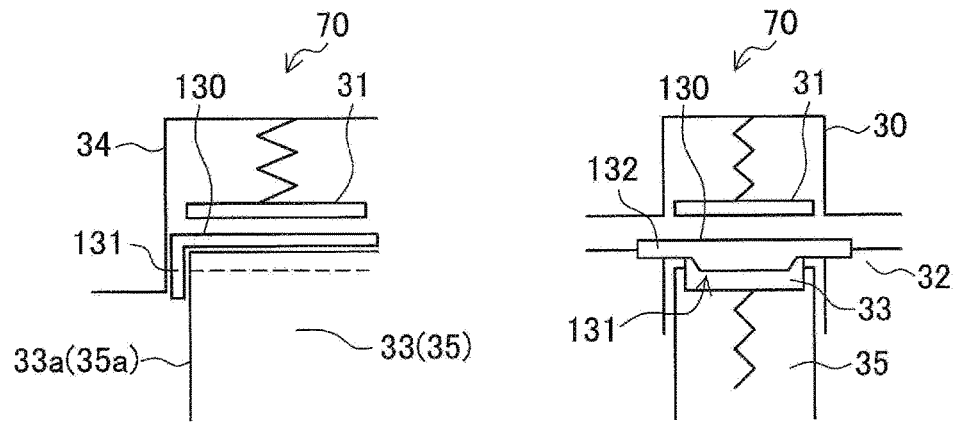
FIGS. 11A-11C are explanatory diagrams schematically illustrating a state where a second intermediate member is obtained from a first intermediate member by a drawing process of an inner pad drawing device in the press-molded product producing method of the same embodiment.
Figure 11B:
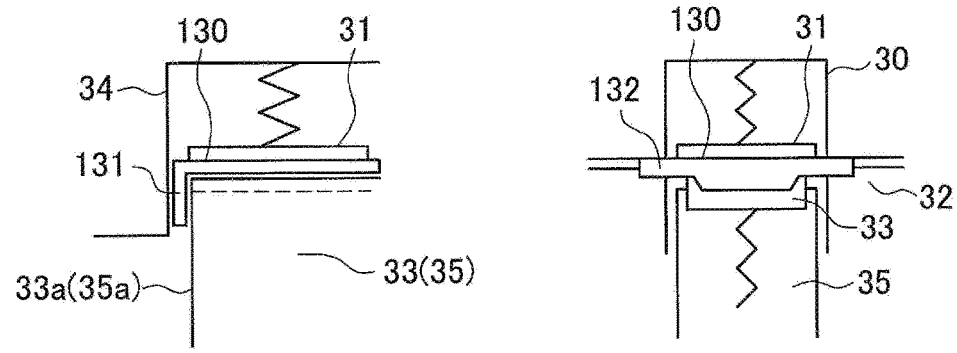
Figure 11C:
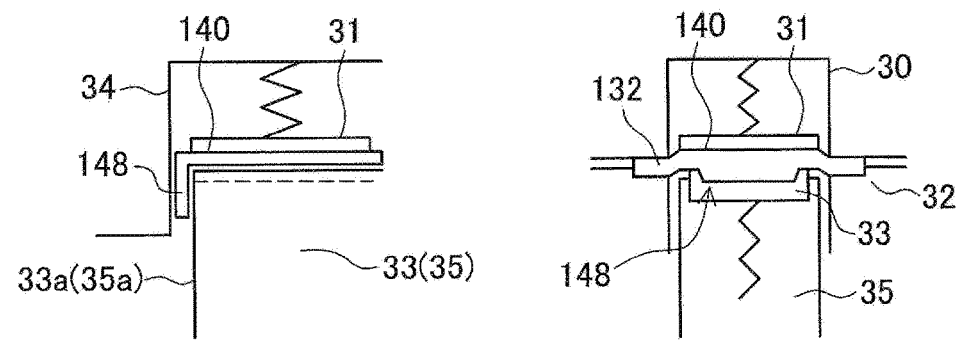

FIGS. 11A-11C are explanatory diagrams schematically illustrating a state where the second intermediate member 140 is obtained from the first intermediate member 130 by an inner pad drawing process using the inner pad drawing device 70. In FIGS. 11A-11C, the column (a) indicates a diagram when viewed in a direction intersecting the longitudinal direction of the first intermediate member 130 and the column (b) indicates a diagram when viewed in the longitudinal direction of the first intermediate member 130. Further, FIG. 11A illustrates a state where the first intermediate member 130 is set in the inner pad drawing device 70, FIG. 11B illustrates a state where the pad 31 contacts the first intermediate member 130, and FIG. 11C illustrates a state immediately before an inner pad drawing process ends.

As illustrated in FIGS. 11A-11C, the inner pad drawing process can be performed similarly to the drawing process illustrated in FIGS. 10A-10C except that the drawing process is performed by the punch 35 with the inner pad 33 supported so as to be movable in the mold clamping direction. Thus, the flange 131 is nipped inside the gap (the first gap) formed by the side surface 35a of the punch 35, the side surface 33a of the inner pad 33, and the out-of-plane deformation restricting tool 34 during the inner pad drawing process, and hence the out-of-plane deformation of the flange 131 is suppressed. Accordingly, the intermediate ridge-portion flanges 145a and 145b are formed by an in-plane compression molding process. Also, since the punch 35 with the inner pad 33 is used, an increase in the plate thickness of the area of the edge portion of the intermediate continuous flange 148 in the width direction is reduced. Particularly, an increase in the plate thickness of the area of the edge portions of the intermediate ridge-portion flanges 145a and 145b is reduced. Thus, it is possible to further suppress the generation of wrinkles in the inward continuous flange 118 formed in the press-molded product 100 as a final molded product.

In this way, since an inner pad drawing process is performed on the first intermediate member 130 in the second intermediate molding step, it is possible to obtain the second intermediate member 140 including the intermediate ridge portions 142a and 142b, the first intermediate surface portions 143a and 143b, the second intermediate surface portion 144, and the intermediate continuous flange 148. The second intermediate member 140 also corresponds to one type of the press-molded product. Thus, the inner pad drawing device 70 is one type of the press-molded product producing apparatus of the invention used to produce the press-molded product 100 as a final molded product.

(3-1-3. Second Intermediate Molding Step by Bending Device)

The second intermediate molding step described so far is performed by the drawing process, but the second intermediate molding step may be performed by a bending process instead of the drawing process. The basic configuration of the bending device used to perform the bending process in the second intermediate molding step may be the same as that of the bending device used in the first press-molding step of the second embodiment.

Here, when the second intermediate member 140 is formed by a bending process, the moving distance in which the die 30 moves close to the punch 35 is set to be shorter than the moving distance of the first press-molding step. For example, the moving distance can be shortened when an area in which the punch 35 advances in the die 30 is decreased. Accordingly, the end portion 132 of the first intermediate member 130 is held while not being completely bent. By such a bending process, the intermediate ridge portions 142a and 142b, and the first intermediate surface portions 143a and 143b and the second intermediate surface portion 144 respectively connected to the intermediate ridge portions 142a and 142b are formed. In the embodiment, the first intermediate surface portions 143a and 143b are not parallel to the second intermediate surface portion 144 in the second intermediate member 140, and the first intermediate surface portions 143a and 143b are formed so as to extend in the inclination direction with respect to the second intermediate surface portion 144.

During such a bending process, the flange 131 formed in the first intermediate member 130 is nipped inside the gap (the first gap) formed by the side surface 35a of the punch 35 and the out-of-plane deformation restricting tool 34, and hence the out-of-plane deformation of the flange 131 is suppressed. Thus, the intermediate ridge-portion flanges 145a and 145b are formed by an in-plane compression molding process, and hence the generation of wrinkles in the intermediate continuous flange 148 is suppressed.

Also in the embodiment, the bending process can be performed by a mold having a simple configuration compared with the drawing process. Meanwhile, in the bending process, a large increase in the plate thickness of the ridge-portion flanges 115a and 115b easily occurs compared with the drawing process. Here, the drawing process is better than the bending process in that the die-galling of the second intermediate member 140 or the press-molded product 100 as a final molded product can be reduced and the loss of the mold can be reduced.

In this way, since the first intermediate member 130 is bent in the second intermediate molding step, it is possible to obtain the second intermediate member 140 including the intermediate ridge portions 142a and 142b, the first intermediate surface portions 143a and 143b, the second intermediate surface portion 144, and the intermediate continuous flange 148. The second intermediate member 140 also corresponds to one type of the press-molded product. Thus, the bending device used in such a bending process corresponds to one type of the press-molded product producing apparatus of the invention used to produce the press-molded product 100 as a final molded product.

(3-2. Second Press-Molding Step)

In the second press-molding step, the configuration of the press-molding apparatus or the press-molding method is not particularly limited as long as the press-molded product 100 can be obtained from the second intermediate member 140 by, for example, a press-molding process such as a bending process. Hereinafter, an example of a press-molding method of obtaining the press-molded product 100 as a final molded product from the second intermediate member 140 and a press-molding apparatus 80 used in the second press-molding step will be described with reference to FIGS. 12A-12B and 13A-13B.

Figure 12A:
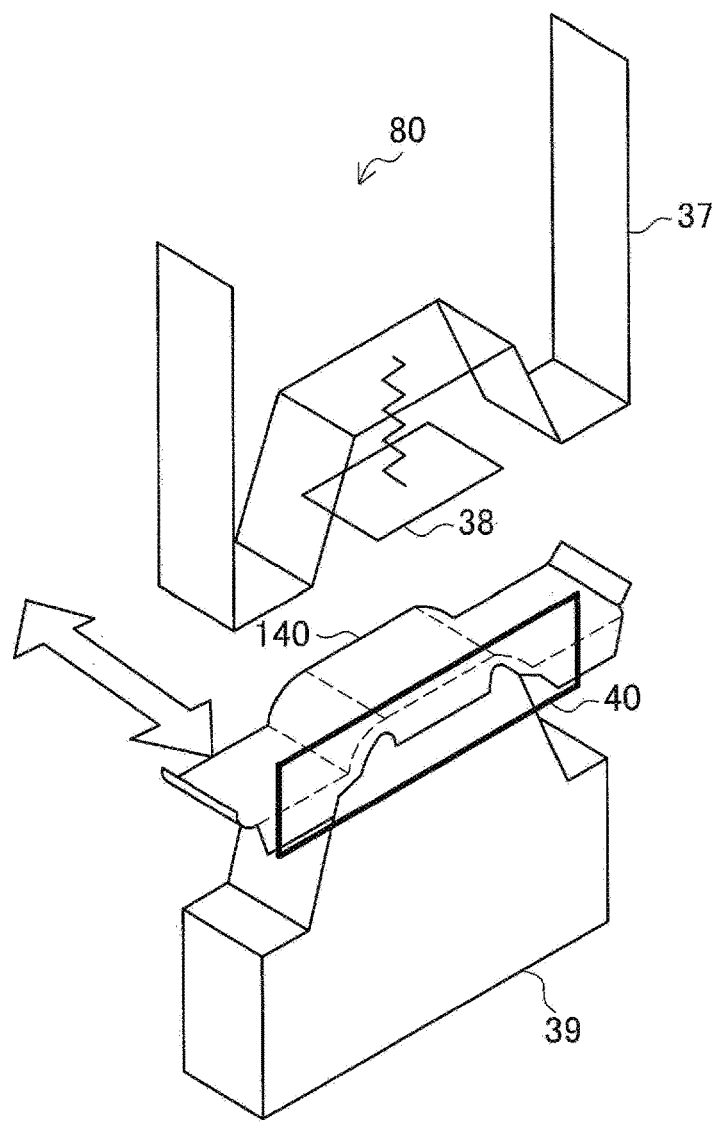
FIG. 12A is an explanatory diagram schematically illustrating a configuration example of a press-molding apparatus used for a bending process and FIG. 12B is a picture illustrating an example of the appearance of a press-molded product obtained by a bending process.
Figure 12B:
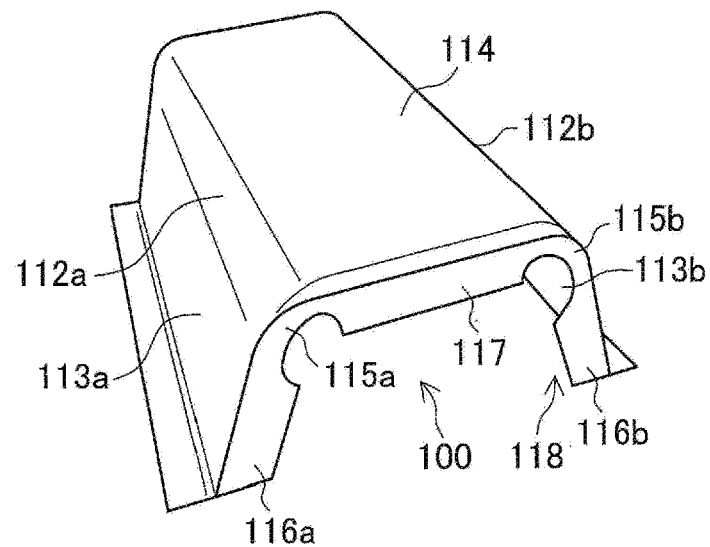

FIG. 12A is a schematic diagram illustrating a part of a configuration example of the press-molding apparatus 80 used in the bending process. Further, FIG. 12B is a perspective view illustrating an example of the appearance of the press-molded product 100 obtained by the bending process using such a press-molding apparatus 80. The basic configuration of the press-molding apparatus 80 can be the same as that of the press-molding apparatus 90 used in the first intermediate molding step of the second embodiment. Here, the press-molding apparatus 80 used in the second press-molding step includes an out-of-plane deformation restricting tool 40 which is disposed so as to face a side surface 39a of a punch 39 during a press-molding process.

The distance of the gap (the second gap) formed by the side surface 39a of the punch 39 and the out-of-plane deformation restricting tool 40 may be equal to the distance of the gap (the first gap) of the forming apparatus used in the first press-molding step or the second intermediate molding step. In addition, FIG. 12A partially illustrates the press-molding apparatus 80 in the periphery of the end portion of the second intermediate member 140 in the longitudinal direction (a direction indicated by the white arrow of FIG. 12A).

Figure 13A:
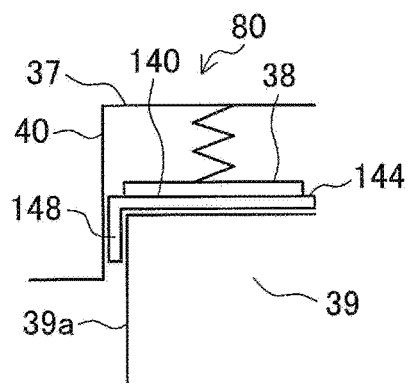
FIGS. 13A-13B are explanatory diagrams schematically illustrating a state where a press-molded product is obtained from a second intermediate member in the press-molded product producing method of the same embodiment.
Figure 13A:
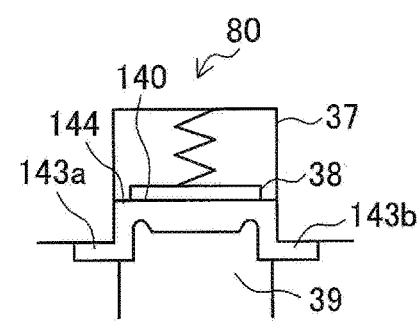
Figure 13B:
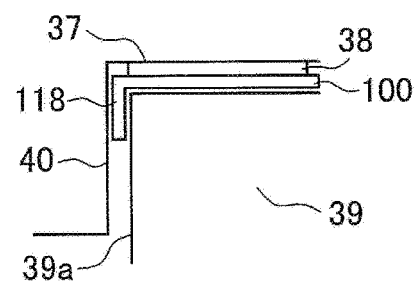

FIGS. 13A-13B are explanatory diagrams schematically illustrating a state where the press-molded product 100 is obtained from the second intermediate member 140 by a bending process using the press-molding apparatus 80. In FIGS. 13A-13B, the column (a) indicates a diagram when viewed in a direction intersecting the longitudinal direction of the second intermediate member 140 and the column (b) indicates a diagram when viewed in the longitudinal direction of the second intermediate member 140. Further, FIG. 13A illustrates a state where a pad 38 contacts the second intermediate member 140, and FIG. 13B illustrates a state where a bending process ends.

As illustrated in FIGS. 13A-13B, the second press-molding step using the bending process can be performed basically similarly to the first intermediate molding step of the second embodiment. That is, the second intermediate member 140 is set on the punch 39, and then the second intermediate surface portion 144 of the second intermediate member 140 is constrained and held by the pad 38 supported by a die 37 so as to be movable in the mold clamping direction and the punch 39. In this state, a press-molding process of bending the first intermediate surface portions 143a and 143b is performed in a manner that the punch 39 and the die 37 move relatively close to each other.

During such a bending process, the intermediate continuous flange 148 formed in the second intermediate member 140 is nipped inside the gap formed by the side surface 39a of the punch 39 and the out-of-plane deformation restricting tool 40, and hence the out-of-plane deformation of the intermediate continuous flange 148 is suppressed. Thus, the ridge-portion flanges 115a and 115b are formed by an in-plane compression molding process, and the generation of wrinkles in the inward continuous flange 118 is suppressed.

By the bending process, as illustrated in FIG. 12B, the press-molded product 100 including the ridge portions 112a and 112b, the first surface portions 113a and 113b, the second surface portion 114, and the inward continuous flange 118 can be obtained. The inward continuous flange 118 does not include a notch and is formed such that the ridge-portion flanges 115a and 115b, the first flanges 116a and 116b, and the second flange 117 are continuously formed inward in cross-section.

In addition, in the embodiment, the end portion of the press-molded product 100 is provided with the inward continuous flange 118 formed in the entire area of the end portions of the ridge portions 112a and 112b, the first surface portions 113a and 113b, and the second surface portion 114. Here, the first flanges 116a and 116b and the second flange 117 may be formed in a part of the area of the end portions of the first surface portions 113a and 113b and the second surface portion 114. The first flanges 116a and 116b and the second flange 117 may be formed so as to be continuous from the ridge-portion flanges 115a and 115b.

Further, in the bending process of the second press-molding step, the ridge portion is not subjected to an additional bending process or a load applied thereto during the bending process is very small in accordance with the processing condition. For that reason, the distance of the gap (the second gap) formed by the side surface 35a of the punch 35 and the out-of-plane deformation restricting tool 40 may be larger than the gap (the first gap) formed in the forming apparatus used in the first press-molding step or the second intermediate molding step.

As described above, in the press-molded product producing method according to the embodiment, it is possible to produce the press-molded product 100 with the inward continuous flange 118 suppressing the generation of wrinkles without forming a notch by the use of the high-strength steel plate. Thus, it is possible to obtain the press-molded product 100 which can be used in the vehicle body reinforcing member and has high rigidity and excellent load transfer efficiency.

EXAMPLES

Hereinafter, Examples of the invention will be described.

Examples 1 and 2 and Comparative Example 1

First, the press-molded products were produced by two press-molding apparatuses having the same configuration except for the existence of the out-of-plane deformation restricting tool, and the inward continuous flanges were compared with each other. The press-molded products were produced according to the press-molded product producing method of the second embodiment.

In Examples 1 and 2, a press-molded product having a hat-shaped cross-section and an inward continuous flange was produced according to the press-molded product producing method of the second embodiment by using a blank as a cold rolled steel plate having a plate thickness of 1.0 mm and a tensile strength of 980 MPa level. That is, a flange was formed in the longitudinal end portion of the blank in the first intermediate molding step, and then was press-molded by using a drawing device with an out-of-plane deformation restricting tool in the first press-molding step.

At this time, the distance x of the gap formed between the out-of-plane deformation restricting tool and the side surface of the punch was set to 1.33 mm in Example 1 and was set to 1.41 mm in Example 2. Further, in Comparative Example 1, the first press-molding step was performed without using the out-of-plane deformation restricting tool. The curvature radius rf of the ridge portion of the press-molded product was set to 5 mm, and the width Lf of the flat portion of the ridge-portion flange was set to 2 mm. Further, the angle θ formed between the first surface portion and the second surface portion of the press-molded product was set to 90°. The width Lf of such a flange is a value smaller than 6.9 as the result of the equation of 0.22×rf+0.13×θ−5.9. That is, the obtained press-molded product satisfies Equation (1) above. Further, the same blank was used in Examples 1 and 2 and Comparative Example 1.

FIGS. 14A-14C are pictures illustrating the appearances in the vicinity of the ridge-portion flanges of the press-molded products obtained in Examples 1 and 2 and Comparative Example 1. FIG. 14A illustrates the press-molded product of Example 1, and FIG. 14B illustrates the press-molded product of Example 2. Further, FIG. 14C illustrates the press-molded product of Comparative Example 1. Since the press-molded product of Comparative Example 1 illustrated in FIG. 14C was obtained by the first press-molding step not using the out-of-plane deformation restricting tool, the ridge-portion flange was deformed largely outward. On the contrary, since the press-molded products of Examples 1 and 2 illustrated in FIG. 14A and FIG. 14B were obtained by the first press-molding step using the out-of-plane deformation restricting tool, the ridge-portion flange was compressed within a plane, and hence an inward continuous flange having a satisfactory shape having few wrinkles was obtained.

Further, in the press-molded product of Example 2 illustrated in FIG. 14B, a small amount of waviness was visually found on the surface of the inward continuous flange in the area from the first flange to the ridge-portion flange and the second flange. On the contrary, such waviness was not found in the press-molded product of Example 1 illustrated in FIG. 14A. Thus, it was understood that the inward continuous flange having a satisfactory shape was obtained when the distance of the gap formed between the side surface of the punch and the out-of-plane deformation restricting tool was small.

Examples 3, 4, and 5

Next, the plate thickness increase rates of the inward continuous flanges obtained by the drawing process, the inner pad drawing process, and the bending process in the press-molding process using the out-of-plane deformation restricting tool were compared with each other. The press-molded product was obtained according to the second embodiment.

In Examples 3 to 5, a press-molded product having a hat-shaped cross-section and an inward continuous flange was produced according to the press-molded product producing method of the second embodiment by using a blank as a cold rolled steel plate having a plate thickness of 1.0 mm and a tensile strength of 980 MPa level. That is, a flange was formed in the longitudinal end portion of the blank in the first intermediate molding step, and then was press-molded by a bending device or a drawing device with an out-of-plane deformation restricting tool in the first press-molding step.

As the press-molding apparatus used in the first press-molding step, a drawing device was used in Example 3, an inner pad drawing device was used in Example 4, and a bending device was used in Example 5. These forming apparatuses all included the out-of-plane deformation restricting tool, and the out-of-plane deformation restricting tool was disposed so that the distance x of the gap between the side surface of the inner pad or the punch and the out-of-plane deformation restricting tool was 1.18 times the plate thickness t of the blank. The curvature radius rf of the ridge portion of the press-molded product was set to 5 mm, and the width Lf of the flat portion of the ridge-portion flange was set to 2 mm. In Examples 3 to 5, the same blank was used.

FIG. 15 is a graph illustrating a distribution of a plate thickness increase rate of each of the edge portions of the ridge-portion flanges formed in the press-molded products of Examples 3 to 5. The horizontal axis of the graph of FIG. 15 indicates the distance (mm) of the edge portion of the flange, and the vertical axis of the graph of FIG. 15 indicates the plate thickness increase rate (%). As illustrated in FIG. 1B, the "distance of the edge portion of the flange" indicates the position of the edge portion of the ridge-portion flange 115a on the assumption that the position (the position S of FIG. 1B) in which the plate thickness of the edge portion of the ridge-portion flange 115a starts to increase from the plate thickness of the blank is set to the starting point 0.

As illustrated in FIG. 15, when the first press-molding step is performed by a drawing process and an inner pad drawing process, an increase in plate thickness is widely distributed compared with the case where the first press-molding step is performed by a bending process, and hence the peak value of the plate thickness increase rate decreases. Thus, when the first press-molding step is performed by the drawing process or the inner pad drawing process, it is possible to suppress a change in the plate thickness of the ridge-portion flange, and hence to obtain a press-molded product with an inward continuous flange having a satisfactory shape. Among these, when the first press-molding step is performed by the inner pad drawing process, the peak value of the plate thickness increase rate further decreases compared with the case where a drawing process is performed without the inner pad. Thus, it is proved that the larger effect is obtained in the inner pad drawing process.

Examples 6 to 17 and Comparative Examples 2 to 13

Next, a wrinkle generation state was compared in consideration of a difference in the flange width Lf, the curvature radius rf of the ridge portion, and the angle θ formed between the first surface portion and the second surface portion when a press-molding process was performed by using the out-of-plane deformation restricting tool.

In Examples 6 to 17 and Comparative Examples 2 to 13, a press-molded product having a hat-shaped cross-section and an inward continuous flange was produced according to the producing method of the second embodiment by using a blank as a cold rolled steel plate having a plate thickness of 1.0 mm and a tensile strength of 980 MPa level. In Examples 6 to 17 and Comparative Examples 2 to 13, the first press-molding step was performed by a drawing process. A wrinkle generation state was evaluated for the inward continuous flanges of the press-molded products obtained in Examples 6 to 17 and Comparative Examples 2 to 13. As for the press-molded products of Examples 6 to 17 and Comparative Examples 2 to 13, the flange width Lf of the ridge portion, the curvature radius rf of the ridge portion, the angle θ, and the wrinkle generation state are shown in Table 1.

TABLE 1

| | θ (°) | rf (mm) | Lf (mm) | Generation of wrinkles |
|---|---|---|---|---|
| Example 6 | 145 | 5.0 | 13.0 | ◯ (No) |
| Example 7 | 145 | 5.0 | 12.0 | ◯ (No) |
| Comparative Example 2 | 145 | 5.0 | 15.0 | X (Yes) |
| Comparative Example 3 | 145 | 5.0 | 14.0 | X (Yes) |
| Example 8 | 145 | 15.0 | 15.0 | ◯ (No) |
| Example 9 | 145 | 15.0 | 14.0 | ◯ (No) |
| Comparative Example 4 | 145 | 15.0 | 18.0 | X (Yes) |
| Comparative Example 5 | 145 | 15.0 | 16.0 | X (Yes) |
| Example 10 | 145 | 25.0 | 17.0 | ◯ (No) |
| Example 11 | 145 | 25.0 | 16.0 | ◯ (No) |
| Comparative Example 6 | 145 | 25.0 | 19.0 | X (Yes) |
| Comparative Example 7 | 145 | 25.0 | 18.0 | X (Yes) |
| Example 12 | 90 | 5.0 | 6.0 | ◯ (No) |
| Example 13 | 90 | 5.0 | 5.0 | ◯ (No) |
| Comparative Example 8 | 90 | 5.0 | 8.0 | X (Yes) |
| Comparative Example 9 | 90 | 5.0 | 7.0 | X (Yes) |
| Example 14 | 90 | 15.0 | 8.0 | ◯ (No) |
| Example 15 | 90 | 15.0 | 7.5 | ◯ (No) |
| Comparative Example 10 | 90 | 15.0 | 9.5 | X (Yes) |
| Comparative Example 11 | 90 | 15.0 | 9.0 | X (Yes) |
| Example 16 | 90 | 25.0 | 10.0 | ◯ (No) |
| Example 17 | 90 | 25.0 | 9.0 | ◯ (No) |
| Comparative Example 12 | 90 | 25.0 | 13.0 | X (Yes) |
| Comparative Example 13 | 90 | 25.0 | 11.0 | X (Yes) |

FIG. 16 is a graph illustrating a wrinkle generation state in each of the press-molded products of Examples 6 to 17 and Comparative Examples 2 to 13. When the angle θ formed by the first surface portion and the second surface portion is any one of 90° and 145°, the limit of the flange width Lf not causing the generation of wrinkles decreases as the curvature radius rf of the ridge portion decreases. The limit of such a flange width Lf can be expressed by approximate Equation (3) below.

$$Lf = 0.22 \times rf + 0.13 \times \theta - 5.9 \quad (3)$$

(here, 0 mm≤rf≤35 mm and 90°≤θ≤145°)

Thus, it is proved that the flange width Lf of the ridge portion preferably satisfies Equation (1) as below in order to suppress the generation of wrinkles in the inward continuous flange.

$$Lf \leq 0.22 \times rf + 0.13 \times \theta - 5.9 \qquad (1)$$

(here, 0 mm≤rf≤35 mm and 90°≤θ≤145°)

REFERENCE SIGNS LIST 10 press-molding apparatus (press-molded product producing apparatus)
10A drawing device (press-molded product producing apparatus)
10B inner pad drawing device (press-molded product producing apparatus)
30 die
31 pad
32 blank holder
33 inner pad
34 out-of-plane deformation restricting tool
35 punch
35a side surface
37 die
38 pad
39 punch
39a side surface
40 out-of-plane deformation restricting tool
50 bending device
60 drawing device
70 inner pad drawing device (press-molded product producing apparatus)
80 press-molding apparatus (press-molded product producing apparatus)
90 press-molding apparatus
91 die
92 pad
95 punch
100 press-molded product
112a, 112b ridge portion
113a, 113b first surface portion
114 second surface portion
115a, 115b ridge-portion flange
116a, 116b first flange
117 second flange
118 inward continuous flange
120 blank
130 first intermediate member
131 flange
140 second intermediate member
142a, 142b intermediate ridge portion
143a, 143b first intermediate surface portion
144 second intermediate surface portion
145a, 145b intermediate ridge-portion flange
146a, 146b first intermediate flange
147 second intermediate flange
148 intermediate continuous flange

The invention claimed is:

1. A press-molded product producing method comprising:
a first intermediate molding step of bending at least one end portion of a blank formed by a steel plate having a tensile strength of 340 MPa or more in a predetermined direction so as to mold the blank into a first intermediate member having a flange; and
a first press-molding step of bending the first intermediate member in the predetermined direction by press-molding the first intermediate member while nipping the flange so as to mold a ridge portion extending in the predetermined direction and a first surface portion and a second surface portion respectively extending from both ends of a ridge line formed by the ridge portion and to mold the flange into an inward continuous flange, the inward continuous flange having a ridge-portion flange formed inward in an end portion of the ridge portion, a first flange formed inward in at least a part of an area of an end portion of the first surface portion, and a second flange formed inward in at least a part of an area of an end portion of the second surface portion, the ridge-portion flange, the first flange, and the second flange being continuous to one another,
wherein in the first press-molding step, a press-molding mold including a die, a punch disposed so as to face the die, and an out-of-plane deformation restricting tool disposed so as to face a side surface of the punch and to suppress out-of-plane deformation of the inward continuous flange is used, and the first intermediate member is disposed on the punch and the first intermediate member is press-molded by the die and the punch while the inward continuous flange is nipped inside a predetermined first gap formed by the side surface of the punch and the out-of-plane deformation restricting tool, and
wherein the die supports a pad pressing the first intermediate member such that the pad is movable in a pressing direction.

2. The press-molded product producing method according to claim 1,
wherein a distance (x) of the first gap satisfies:

$$1.00 \times t \leq x < 1.40 \times t,$$

where t is a plate thickness (mm) of the blank, and x is the distance (mm) of the gap.

3. A press-molded product producing method comprising:
a first intermediate molding step of bending at least one end portion of a blank formed by a steel plate having a tensile strength of 340 MPa or more in a predetermined direction so as to mold the blank into a first intermediate member having a flange; and
a first press-molding step of bending the first intermediate member in the predetermined direction by press-molding the first intermediate member while nipping the flange so as to mold a ridge portion extending in the predetermined direction and a first surface portion and a second surface portion respectively extending from both ends of a ridge line formed by the ridge portion and to mold the flange into an inward continuous flange, the inward continuous flange having a ridge-portion flange formed inward in an end portion of the ridge portion, a first flange formed inward in at least a part of an area of an end portion of the first surface portion, and a second flange formed inward in at least a part of an area of an end portion of the second surface portion, the ridge-portion flange, the first flange, and the second flange being continuous to one another,
wherein in the first press-molding step, a press-molding mold including a die, a punch disposed so as to face the die, and an out-of-plane deformation restricting tool disposed so as to face a side surface of the punch and to suppress out-of-plane deformation of the inward continuous flange is used, and the first intermediate member is disposed on the punch and the first intermediate member is press-molded by the die and the punch while the inward continuous flange is nipped inside a predetermined first gap formed by the side surface of the punch and the out-of-plane deformation restricting tool, and wherein in the first press-molding step, the press-molding mold further includes a blank holder which faces the die, and a part of the first intermediate member is drawn while being constrained by the die and the blank holder.

4. The press-molded product producing method according to claim 3, wherein a distance (x) of the first gap satisfies:

$1.00 \times t \le x < 1.40 \times t$, where t is a plate thickness (mm) of the blank, and x is the distance (mm) of the gap.

5. A press-molded product producing method comprising:

a first intermediate molding step of bending at least one end portion of a blank formed by a steel plate having a tensile strength of 340 MPa or more in a predetermined direction so as to mold the blank into a first intermediate member having a flange; and a first press-molding step of bending the first intermediate member in the predetermined direction by press-molding the first intermediate member while nipping the flange so as to mold a ridge portion extending in the predetermined direction and a first surface portion and a second surface portion respectively extending from both ends of a ridge line formed by the ridge portion and to mold the flange into an inward continuous flange, the inward continuous flange having a ridge-portion flange formed inward in an end portion of the ridge portion, a first flange formed inward in at least a part of an area of an end portion of the first surface portion, and a second flange formed inward in at least a part of an area of an end portion of the second surface portion, the ridge-portion flange, the first flange, and the second flange being continuous to one another, wherein in the first press-molding step, a press-molding mold including a die, a punch disposed so as to face the die, and an out-of-plane deformation restricting tool disposed so as to face a side surface of the punch and to suppress out-of-plane deformation of the inward continuous flange is used, and the first intermediate member is disposed on the punch and the first intermediate member is press-molded by the die and the punch while the inward continuous flange is nipped inside a predetermined first gap formed by the side surface of the punch and the out-of-plane deformation restricting tool, wherein the punch of the press-molding mold supports an inner pad contacting one surface of the first intermediate member such that the inner pad is movable in a mold clamping direction, and wherein in the first press-molding step, the first intermediate member is press-molded by the die, the punch, and the inner pad while the flange is nipped inside the first gap formed by side surfaces of the punch, including the side surface of the punch, and the inner pad and the out- of-plane deformation restricting tool.

6. The press-molded product producing method according to claim 5, wherein a distance (x) of the first gap satisfies:

$1.00 \times t \le x < 1.40 \times t$, where t is a plate thickness (mm) of the blank, and x is the distance (mm) of the gap.

7. A press-molded product producing apparatus used to produce a press-molded product including a ridge portion extending in a predetermined direction and a first surface portion and a second surface portion respectively extending from both ends of a ridge line formed by the ridge portion and also including an inward continuous flange in at least one end portion of the press-molded product in the predetermined direction, the inward continuous flange being obtained by continuously forming a ridge-portion flange formed inward in an end portion of the ridge portion, a first flange formed inward in at least a part of an area of an end portion of the first surface portion, and a second flange formed inward in at least a part of an area of an end portion of the second surface portion, the press-molded product producing apparatus comprising:

a punch which contacts one surface of an intermediate member having a flange in at least one end portion of the intermediate member in the predetermined direction;

a die which is disposed so as to face the punch; and an out-of-plane deformation restricting tool which is disposed so as to face a side surface of the punch when the intermediate member is press-molded and to have a predetermined gap between the out-of-plane deformation restricting tool and the side surface of the punch so as to nip the flange in the gap, thereby suppressing out-of-plane deformation of the flange of the intermediate member, wherein the die includes a pad which is supported so as to be movable in a mold clamping direction and contacts the other surface of the intermediate member.

8. A press-molded product producing apparatus used to produce a press-molded product including a ridge portion extending in a predetermined direction and a first surface portion and a second surface portion respectively extending from both ends of a ridge line formed by the ridge portion and also including an inward continuous flange in at least one end portion of the press-molded product in the predetermined direction, the inward continuous flange being obtained by continuously forming a ridge-portion flange formed inward in an end portion of the ridge portion, a first flange formed inward in at least a part of an area of an end portion of the first surface portion, and a second flange formed inward in at least a part of an area of an end portion of the second surface portion, the press-molded product producing apparatus comprising:

a punch which contacts one surface of an intermediate member having a flange in at least one end portion of the intermediate member in the predetermined direction;

a die which is disposed so as to face the punch; and an out-of-plane deformation restricting tool which is disposed so as to face a side surface of the punch when the intermediate member is press-molded and to have a predetermined gap between the out-of-plane deformation restricting tool and the side surface of the punch so as to nip the flange in the gap, thereby suppressing out-of-plane deformation of the flange of the intermediate member, wherein the punch includes an inner pad which is supported so as to be movable in a mold clamping direction and contacts the one surface of the intermediate member, and wherein the out-of-plane deformation restricting tool is disposed so as to face side surfaces of the punch, including the side surface of the punch and the inner pad when the intermediate member is press-molded and to have the predetermined gap between the out-of-plane deformation restricting tool and the side surfaces of the punch, including the side surface of the punch, and the inner pad so as to nip the flange in the gap.

9. A press-molded product producing apparatus used to produce a press-molded product including a ridge portion extending in a predetermined direction and a first surface portion and a second surface portion respectively extending from both ends of a ridge line formed by the ridge portion and also including an inward continuous flange in at least one end portion of the press-molded product in the predetermined direction, the inward continuous flange being obtained by continuously forming a ridge-portion flange formed inward in an end portion of the ridge portion, a first flange formed inward in at least a part of an area of an end portion of the first surface portion, and a second flange formed inward in at least a part of an area of an end portion of the second surface portion, the press-molded product producing apparatus comprising:

a punch which contacts one surface of an intermediate member having a flange in at least one end portion of the intermediate member in the predetermined direction;

a die which is disposed so as to face the punch;

an out-of-plane deformation restricting tool which is disposed so as to face a side surface of the punch when the intermediate member is press-molded and to have a predetermined gap between the out-of-plane deformation restricting tool and the side surface of the punch so as to nip the flange in the gap, thereby suppressing out-of-plane deformation of the flange of the intermediate member; and a blank holder which faces the die, wherein the intermediate member is drawn while being constrained by the die and the blank holder during the press-molding process.

* * * * *